US011184777B2

(12) United States Patent
Xue et al.

(10) Patent No.: US 11,184,777 B2
(45) Date of Patent: Nov. 23, 2021

(54) SYNCHRONOUS SHARED SPECTRUM

(71) Applicant: QUALCOMM Incorporated, San Diego, CA (US)

(72) Inventors: Yisheng Xue, San Diego, CA (US); Aleksandar Damnjanovic, Del Mar, CA (US); Tamer Kadous, San Diego, CA (US); Xiaoxia Zhang, San Diego, CA (US); Jing Sun, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/513,283

(22) Filed: Jul. 16, 2019

(65) Prior Publication Data

US 2020/0029221 A1 Jan. 23, 2020

Related U.S. Application Data

(60) Provisional application No. 62/700,637, filed on Jul. 19, 2018.

(51) Int. Cl.
*H04W 16/14* (2009.01)
*H04W 72/14* (2009.01)
*H04W 72/10* (2009.01)
*H04W 24/08* (2009.01)
*H04W 74/08* (2009.01)

(52) U.S. Cl.
CPC .......... *H04W 16/14* (2013.01); *H04W 24/08* (2013.01); *H04W 72/10* (2013.01); *H04W 72/14* (2013.01); *H04W 74/0808* (2013.01)

(58) Field of Classification Search
CPC ..... H04W 16/14; H04W 24/08; H04W 72/10; H04W 72/14; H04W 74/0808
USPC ........................................................ 370/329
See application file for complete search history.

(56) References Cited

U.S. PATENT DOCUMENTS

| | | | |
|---|---|---|---|
| 2005/0180430 A1* | 8/2005 | Kawaguchi | H04L 47/70 370/395.41 |
| 2017/0013470 A1 | 1/2017 | Sun et al. | |
| 2018/0167848 A1* | 6/2018 | Lei | H04W 28/26 |
| 2018/0352572 A1* | 12/2018 | Cariou | H04W 74/085 |
| 2020/0228230 A1* | 7/2020 | Mukherjee | H04L 1/1896 |

OTHER PUBLICATIONS

International Search Report and Written Opinion—PCT/US2019/042216—ISA/EPO—dated Sep. 17, 2019.

* cited by examiner

*Primary Examiner* — Faisal Choudhury
(74) *Attorney, Agent, or Firm* — Liem T. Do

(57) ABSTRACT

Methods, systems, and devices for wireless communications are described. A base station of a first network operator (OP) may determine a priority for the first OP for a transmission opportunity of a shared or unlicensed channel. The priority may be lower than a priority of a second OP for the transmission opportunity. Base station may transmit a tentative grant to a user equipment (UE) of the first OP scheduling transmissions over resources of the transmission opportunity. The transmitting device of the first OP may monitor a contention window for reservation signals communicated by devices of the second OP. Based on the monitoring and the tentative grant, the transmitting device of the first OP may perform the transmission over the resources of the shared or unlicensed channel.

28 Claims, 17 Drawing Sheets

SYNCHRONOUS SHARED SPECTRUM

CROSS REFERENCE

The present application for patent claims the benefit of U.S. Provisional Patent Application No. 62/700,637 by XUE et al., entitled "SYNCHRONOUS SHARED SPECTRUM," filed Jul. 19, 2018, assigned to the assignee hereof, and expressly incorporated herein.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may operate in a shared or unlicensed radio frequency spectrum band and different medium capture techniques may be used in order for a device to gain access to the shared or unlicensed radio frequency spectrum band. For example, in some medium capture techniques, the wireless device (e.g., a base station or UE) may perform contention-based procedures such as a listen-before-talk (LBT) procedure, a clear channel assessment (CCA) procedure, or the like, on a channel of the shared or unlicensed band in order to capture the medium for a transmission. When the LBT procedure is unsuccessful (e.g., the channel(s) is/are busy; energy is detected on the channel), the wireless device may perform a backoff procedure where the device waits before attempting to capture the medium again. These medium capture techniques, however, may result in a lack of fairness in gaining access to a shared or unlicensed channel, as well as an increase in overhead due to stringent signal to interference and noise ratio (SINR) and spatial reuse standards.

In other examples of medium capture techniques, access to a shared or unlicensed channel may be coordinated based on synchronized contention. Network operators (OPs) may attempt to gain access to the shared or unlicensed spectrum based on priorities of the OPs, where each OP may implement a contention-based procedure based on a priority associated with the OP. However, devices of different OPs that undergo a contention-based procedure may expend valuable resources of the medium, thereby increasing latency and overhead.

SUMMARY

The described techniques relate to improved methods, systems, devices, and apparatuses that support synchronous shared spectrum operations. Generally, the described techniques provide for a tentative grant transmitted by a base station to a user equipment (UE) for a priority-based transmission opportunity (TxOP). For example, the base station may be associated with a first network operator (OP) that is assigned a priority for accessing a TxOP of the shared spectrum. If the base station operating according to the first OP gains access to the TxOP over a second device operating according to a second OP of lower priority, then the base station may use the TxOP for communicating with one or more other devices or UEs. In some cases, the base station may transmit a tentative grant to the UE after or during the current TxOP where the tentative grant schedules communications between the base station and the UE over resources of a next TxOP. The transmitting device (e.g., the base station or the UE) may, based on the tentative grant, monitor resources for reservation signals transmitted from devices of the second OP that have a higher priority than the first OP during the next TxOP.

Based on the monitoring, the transmitting device of the first OP may determine whether communicating over the resources indicated by the tentative grant will interfere with communications during the second TxOP based on the monitored reservation signals (e.g., reservation signals received from devices of the second OP). If the transmitting device of the first OP determines that communicating in the TxOP may interfere with communications of the second OP, then the transmitting device may refrain from communicating. If the transmitting device of the first OP determines that communicating in the TxOP may not interfere with communications of the second OP, then the transmitting device may communicate over the resources of the TxOP indicated in the tentative grant. Accordingly, the amount of resources dedicated to reservation signals (e.g., a contention window size) may be reduced, which may reduce latency and overhead within a wireless communications system.

A method of wireless communications at a base station associated with a first network OP is described. The method may include determining a prioritization of the first network OP for a first TxOP and a second TxOP, where the first network OP is higher priority than a second network OP during the first TxOP and the second network OP is higher priority than the first network OP during the second TxOP, transmitting a tentative grant to a UE over a channel of a shared radio frequency spectrum band using resources within the first TxOP associated with tentative grants based on the determined prioritization, where the tentative grant schedules a downlink data transmission using the channel over a set of resources of the second TxOP subsequent to the first TxOP, monitoring, during a contention window of the second TxOP, for one or more contention messages from a device associated with the second network OP, and performing the downlink data transmission based on the tentative grant and a result of the monitoring.

An apparatus for wireless communications at a base station associated with a first network OP is described. The apparatus may include a processor, memory in electronic communication with the processor, and instructions stored in the memory. The instructions may be executable by the processor to cause the apparatus to determine a prioritization of the first network OP for a first TxOP and a second TxOP, where the first network OP is higher priority than a second network OP during the first TxOP and the second network OP is higher priority than the first network OP during the second TxOP, transmit a tentative grant to a UE over a channel of a shared radio frequency spectrum band using resources within the first TxOP associated with tentative grants based on the determined prioritization, where the tentative grant schedules a downlink data transmission using the channel over a set of resources of the second TxOP subsequent to the first TxOP, monitor, during a contention window of the second TxOP, for one or more contention messages from a device associated with the second network OP, and perform the downlink data transmission based on the tentative grant and a result of the monitoring.

Another apparatus for wireless communications at a base station associated with a first network OP is described. The apparatus may include means for determining a prioritization of the first network OP for a first TxOP and a second TxOP, where the first network OP is higher priority than a second network OP during the first TxOP and the second network OP is higher priority than the first network OP during the second TxOP, transmitting a tentative grant to a UE over a channel of a shared radio frequency spectrum band using resources within the first TxOP associated with tentative grants based on the determined prioritization, where the tentative grant schedules a downlink data transmission using the channel over a set of resources of the second TxOP subsequent to the first TxOP, monitoring, during a contention window of the second TxOP, for one or more contention messages from a device associated with the second network OP, and performing the downlink data transmission based on the tentative grant and a result of the monitoring.

A non-transitory computer-readable medium storing code for wireless communications at a base station associated with a first network OP is described. The code may include instructions executable by a processor to determine a prioritization of the first network OP for a first TxOP and a second TxOP, where the first network OP is higher priority than a second network OP during the first TxOP and the second network OP is higher priority than the first network OP during the second TxOP, transmit a tentative grant to a UE over a channel of a shared radio frequency spectrum band using resources within the first TxOP associated with tentative grants based on the determined prioritization, where the tentative grant schedules a downlink data transmission using the channel over a set of resources of the second TxOP subsequent to the first TxOP, monitor, during a contention window of the second TxOP, for one or more contention messages from a device associated with the second network OP, and perform the downlink data transmission based on the tentative grant and a result of the monitoring.

Some examples of the method, apparatuses, and non-transitory computer-readable medium described herein may further include operations, features, means, or instructions for determining that the second TxOP may be available for communication based on the monitoring and transmitting the downlink data transmission to the UE during the second TxOP based on the determination that the second TxOP may be available.

Some examples of the method, apparatuses, and non-transitory computer-readable medium described herein may further include operations, features, means, or instructions for determining that the second TxOP may be unavailable for communication based on the monitoring and withholding the downlink data transmission until a next TxOP.

Some examples of the method, apparatuses, and non-transitory computer-readable medium described herein may further include operations, features, means, or instructions for communicating with a second UE over resources of the first TxOP and transmitting the tentative grant to the UE after communicating with the second UE.

Some examples of the method, apparatuses, and non-transitory computer-readable medium described herein may further include operations, features, means, or instructions for gaining access to communicate during the first TxOP based on a contention-based procedure, where the tentative grant may be transmitted after gaining access to communicate during the first TxOP.

Some examples of the method, apparatuses, and non-transitory computer-readable medium described herein may further include operations, features, means, or instructions for participating in a coordinated rate control with one or more devices for the first TxOP.

In some examples of the method, apparatuses, and non-transitory computer-readable medium described herein, the coordinated rate control may be based on a common interference management resource (IMR) configuration.

In some examples of the method, apparatuses, and non-transitory computer-readable medium described herein, the coordinated rate control may be indicated by a number of coordinated rate control signals.

Some examples of the method, apparatuses, and non-transitory computer-readable medium described herein may further include operations, features, means, or instructions for transmitting the tentative grant over a reserved symbol within the first TxOP.

In some examples of the method, apparatuses, and non-transitory computer-readable medium described herein, transmitting the tentative grant may include operations, features, means, or instructions for transmitting a one-bit indicator field that conveys an indication of the tentative grant.

In some examples of the method, apparatuses, and non-transitory computer-readable medium described herein, the tentative grant may include a tentative transmitter identifier (ID), a tentative receiver ID, a tentative set of radio resources, a clear channel assessment (CCA) threshold, a plurality of coordinated rate control signals, a rank threshold, a channel quality indication (CQI) threshold, or hybrid automatic resource request (HARQ) feedback information, or any combination thereof.

Some examples of the method, apparatuses, and non-transitory computer-readable medium described herein may further include operations, features, means, or instructions for determining a priority of the second network OP for the first TxOP and the second TxOP, where transmitting the tentative grant may be based on the determined priority of the second network OP.

A method of wireless communications at a UE is described. The method may include receiving a tentative grant from a base station associated with a first network OP over a channel of a shared radio frequency spectrum band using resources within a first TxOP associated with tentative grants, where the tentative grant schedules a downlink data transmission using the channel over a set of resources of a second TxOP subsequent to the first TxOP and monitoring the set of resources of the second TxOP for the downlink data transmission from the base station, where the set of resources is indicated by the tentative grant.

An apparatus for wireless communications at a UE is described. The apparatus may include a processor, memory in electronic communication with the processor, and instructions stored in the memory. The instructions may be executable by the processor to cause the apparatus to receive a tentative grant from a base station associated with a first network OP over a channel of a shared radio frequency spectrum band using resources within a first TxOP associated with tentative grants, where the tentative grant schedules a downlink data transmission using the channel over a set of resources of a second TxOP subsequent to the first TxOP and monitor the set of resources of the second TxOP for the downlink data transmission from the base station, where the set of resources is indicated by the tentative grant.

Another apparatus for wireless communications at a UE is described. The apparatus may include means for receiving a tentative grant from a base station associated with a first network OP over a channel of a shared radio frequency spectrum band using resources within a first TxOP associated with tentative grants, where the tentative grant schedules a downlink data transmission using the channel over a set of resources of a second TxOP subsequent to the first TxOP and monitoring the set of resources of the second TxOP for the downlink data transmission from the base station, where the set of resources is indicated by the tentative grant.

A non-transitory computer-readable medium storing code for wireless communications at a UE is described. The code may include instructions executable by a processor to receive a tentative grant from a base station associated with a first network OP over a channel of a shared radio frequency spectrum band using resources within a first TxOP associated with tentative grants, where the tentative grant schedules a downlink data transmission using the channel over a set of resources of a second TxOP subsequent to the first TxOP and monitor the set of resources of the second TxOP for the downlink data transmission from the base station, where the set of resources is indicated by the tentative grant.

In some examples of the method, apparatuses, and non-transitory computer-readable medium described herein, monitoring the set of resources may include operations, features, means, or instructions for receiving the downlink data transmission from the base station during the second TxOP based on an availability of the second TxOP.

Some examples of the method, apparatuses, and non-transitory computer-readable medium described herein may further include operations, features, means, or instructions for determining a prioritization of the first network OP for the first TxOP and the second TxOP, where the first network OP may be higher priority than a second network OP during the first TxOP and the second network OP may be higher priority than the first network OP during the second TxOP.

In some examples of the method, apparatuses, and non-transitory computer-readable medium described herein, receiving the tentative grant may include operations, features, means, or instructions for receiving a one-bit indicator field that conveys an indication of the tentative grant.

In some examples of the method, apparatuses, and non-transitory computer-readable medium described herein, the tentative grant may include a tentative transmitter ID, a tentative receiver ID, a tentative set of radio resources, a CCA threshold, a plurality of coordinated rate control signals, a rank threshold, a CQI threshold, or HARQ feedback information, or any combination thereof.

A method of wireless communications at a base station associated with a first network OP is described. The method may include determining a prioritization of the first network OP for a first TxOP and a second TxOP, where the first network OP is higher priority than a second network OP during the first TxOP and the second network OP is higher priority than the first network OP during the second TxOP, transmitting a tentative grant to a UE over a channel of a shared radio frequency spectrum band using resources within the first TxOP associated with tentative grants based on the determined prioritization, where the tentative grant schedules an uplink data transmission using the channel over a set of resources of the second TxOP subsequent to the first TxOP, and monitoring the set of resources of the second TxOP for the uplink data transmission from the UE.

An apparatus for wireless communications at a base station associated with a first network OP is described. The apparatus may include a processor, memory in electronic communication with the processor, and instructions stored in the memory. The instructions may be executable by the processor to cause the apparatus to determine a prioritization of the first network OP for a first TxOP and a second TxOP, where the first network OP is higher priority than a second network OP during the first TxOP and the second network OP is higher priority than the first network OP during the second TxOP, transmit a tentative grant to a UE over a channel of a shared radio frequency spectrum band using resources within the first TxOP associated with tentative grants based on the determined prioritization, where the tentative grant schedules an uplink data transmission using the channel over a set of resources of the second TxOP subsequent to the first TxOP, and monitor the set of resources of the second TxOP for the uplink data transmission from the UE.

Another apparatus for wireless communications at a base station associated with a first network OP is described. The apparatus may include means for determining a prioritization of the first network OP for a first TxOP and a second TxOP, where the first network OP is higher priority than a second network OP during the first TxOP and the second network OP is higher priority than the first network OP during the second TxOP, transmitting a tentative grant to a UE over a channel of a shared radio frequency spectrum band using resources within the first TxOP associated with tentative grants based on the determined prioritization, where the tentative grant schedules an uplink data transmission using the channel over a set of resources of the second TxOP subsequent to the first TxOP, and monitoring the set of resources of the second TxOP for the uplink data transmission from the UE.

A non-transitory computer-readable medium storing code for wireless communications at a base station associated with a first network OP is described. The code may include instructions executable by a processor to determine a prioritization of the first network OP for a first TxOP and a second TxOP, where the first network OP is higher priority than a second network OP during the first TxOP and the second network OP is higher priority than the first network OP during the second TxOP, transmit a tentative grant to a UE over a channel of a shared radio frequency spectrum band using resources within the first TxOP associated with tentative grants based on the determined prioritization, where the tentative grant schedules an uplink data transmission using the channel over a set of resources of the second TxOP subsequent to the first TxOP, and monitor the set of resources of the second TxOP for the uplink data transmission from the UE.

In some examples of the method, apparatuses, and non-transitory computer-readable medium described herein, monitoring the set of resources may include operations, features, means, or instructions for receiving the uplink data transmission from the UE via the set of resources of the second TxOP based on an availability of the second TxOP.

Some examples of the method, apparatuses, and non-transitory computer-readable medium described herein may further include operations, features, means, or instructions for transmitting the tentative grant over a reserved symbol within the first TxOP.

Some examples of the method, apparatuses, and non-transitory computer-readable medium described herein may further include operations, features, means, or instructions for determining a priority of the second network OP for the first TxOP and the second TxOP, where transmitting the tentative grant may be based on the determined priority of the second network OP.

In some examples of the method, apparatuses, and non-transitory computer-readable medium described herein, transmitting the tentative grant may include operations, features, means, or instructions for transmitting a one-bit indicator field that conveys an indication of the tentative grant.

In some examples of the method, apparatuses, and non-transitory computer-readable medium described herein, the tentative grant may include a tentative transmitter ID, a tentative receiver ID, a tentative set of radio resources, a CCA threshold, a plurality of coordinated rate control signals, a rank threshold, a CQI threshold, or HARQ feedback information, or any combination thereof.

A method of wireless communications at a UE is described. The method may include receiving a tentative grant from a base station associated with a first network OP over a channel of a shared radio frequency spectrum band using resources within a first TxOP associated with tentative grants, where the tentative grant schedules an uplink data transmission using the channel over a set of resources of a second TxOP subsequent to the first TxOP, monitoring, during a contention window of the second TxOP, for one or more contention messages from a device associated with a second network OP, and performing the uplink data transmission based on the tentative grant and a result of the monitoring.

An apparatus for wireless communications at a UE is described. The apparatus may include a processor, memory in electronic communication with the processor, and instructions stored in the memory. The instructions may be executable by the processor to cause the apparatus to receive a tentative grant from a base station associated with a first network OP over a channel of a shared radio frequency spectrum band using resources within a first TxOP associated with tentative grants, where the tentative grant schedules an uplink data transmission using the channel over a set of resources of a second TxOP subsequent to the first TxOP, monitor, during a contention window of the second TxOP, for one or more contention messages from a device associated with a second network OP, and perform the uplink data transmission based on the tentative grant and a result of the monitoring.

Another apparatus for wireless communications at a UE is described. The apparatus may include means for receiving a tentative grant from a base station associated with a first network OP over a channel of a shared radio frequency spectrum band using resources within a first TxOP associated with tentative grants, where the tentative grant schedules an uplink data transmission using the channel over a set of resources of a second TxOP subsequent to the first TxOP, monitoring, during a contention window of the second TxOP, for one or more contention messages from a device associated with a second network OP, and performing the uplink data transmission based on the tentative grant and a result of the monitoring.

A non-transitory computer-readable medium storing code for wireless communications at a UE is described. The code may include instructions executable by a processor to receive a tentative grant from a base station associated with a first network OP over a channel of a shared radio frequency spectrum band using resources within a first TxOP associated with tentative grants, where the tentative grant schedules an uplink data transmission using the channel over a set of resources of a second TxOP subsequent to the first TxOP, monitor, during a contention window of the second TxOP, for one or more contention messages from a device associated with a second network OP, and perform the uplink data transmission based on the tentative grant and a result of the monitoring.

Some examples of the method, apparatuses, and non-transitory computer-readable medium described herein may further include operations, features, means, or instructions for receiving the tentative grant over a reserved symbol within the first TxOP.

Some examples of the method, apparatuses, and non-transitory computer-readable medium described herein may further include operations, features, means, or instructions for determining that the second TxOP may be available for communication based on the monitoring and transmitting the uplink data transmission to the base station during the second TxOP based on the determination that the second TxOP may be available.

Some examples of the method, apparatuses, and non-transitory computer-readable medium described herein may further include operations, features, means, or instructions for determining that the second TxOP may be unavailable for communication based on the monitoring and withholding the uplink data transmission until a next TxOP.

In some examples of the method, apparatuses, and non-transitory computer-readable medium described herein, receiving the tentative grant may include operations, features, means, or instructions for receiving a one-bit indicator field that conveys an indication of the tentative grant.

In some examples of the method, apparatuses, and non-transitory computer-readable medium described herein, the tentative grant may include a tentative transmitter ID, a tentative receiver ID, a tentative set of radio resources, a CCA threshold, a plurality of coordinated rate control signals, a rank threshold, a CQI threshold, or HARQ feedback information, or any combination thereof.

Some examples of the method, apparatuses, and non-transitory computer-readable medium described herein may further include operations, features, means, or instructions for determining a prioritization of the first network OP for the first TxOP and the second TxOP, where the first network OP may be higher priority than the second network OP during the first TxOP and the second network OP may be higher priority than the first network OP during the second TxOP.

DETAILED DESCRIPTION

Figure 1:
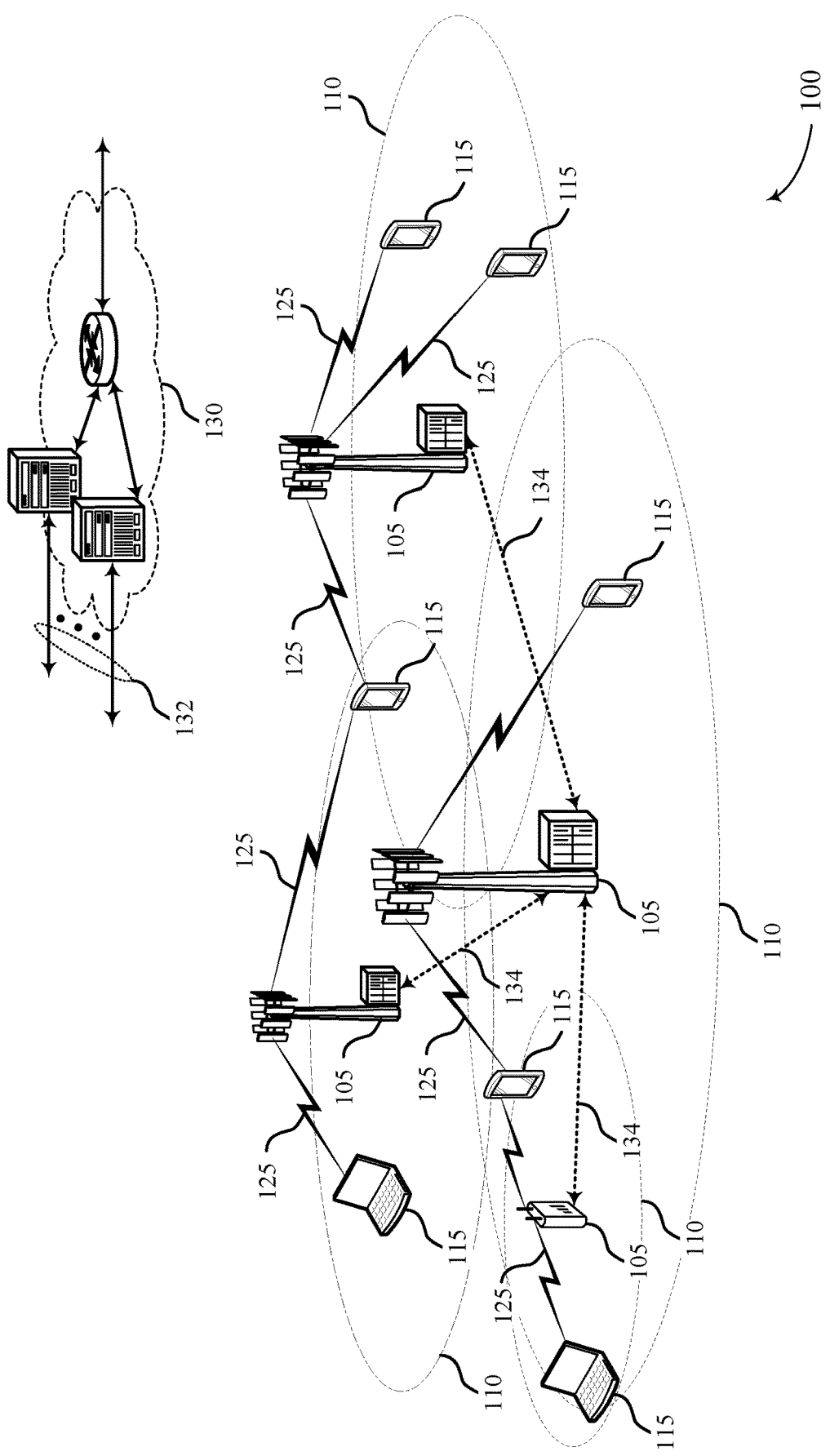
FIG. 1 illustrates an example of a wireless communications system that supports synchronous shared spectrum in accordance with aspects of the present disclosure.

Some wireless communications systems may operate in a shared or unlicensed radio frequency spectrum band where devices perform a contention-based procedure (e.g., a listen-before-talk (LBT) procedure, a clear channel assessment (CCA) procedure, and the like) to capture the medium or channel before performing communication with another wireless device. Some contention-based procedures, however, may be inefficient and may not provide suitable flexibility to the devices for capturing and reserving the medium.

Other wireless communications systems may grant access to the shared or unlicensed radio frequency spectrum band based on synchronized contention. Different network operators (OPs) may be granted different priorities for access to the medium or channel. Contention windows used for reserving the medium may be partitioned based on priorities of the OPs attempting to gain access to the medium (e.g., a highest priority OP communicates reservation signals in a first portion of the contention window, a lower priority OP communicates reservation signals in a second portion of the contention window, etc.). These synchronized contention techniques, however, may result in large contention windows to accommodate the devices of different priorities wishing to communicate over the medium.

Generally, aspects of the described techniques provide for a mechanism where low priority devices listen to reservation transmissions from high priority devices to determine whether to communicate over a shared or unlicensed medium. For example, devices from multiple OPs may attempt to gain access to a shared or unlicensed channel. A priority may be provided to each OP for a given transmission opportunity (TxOP) of the channel. The priorities of the OPs may alternate for different TxOPs, thereby allowing fairer access to the medium across OPs.

A base station associated with a first OP may transmit a tentative grant (e.g., an uplink or downlink grant) to a UE for communicating over a subsequent TxOP. Prior to the subsequent TxOP, devices associated with a second OP, which may be of higher priority than the first OP in the subsequent TxOP, may communicate reservation signals (e.g., a reservation request (RRQ) or reservation response message) to reserve resources of the subsequent TxOP. A device associated with the first OP (of lower priority) may be scheduled to transmit during the subsequent TxOP by the tentative grant and may monitor a contention window prior to the subsequent TxOP for these reservation signals. The transmitting device of the first OP may determine whether communicating in the TxOP may interfere with communications of one or more devices of the second OP during the subsequent TxOP based on the reservation signals.

Aspects of the disclosure are initially described in the context of wireless communications systems. Aspects are then described with respect to a communication scheme and process flows. Aspects of the disclosure are further illustrated by and described with reference to apparatus diagrams, system diagrams, and flowcharts that relate to synchronous shared spectrum.

FIG. 1 illustrates an example of a wireless communications system 100 that supports synchronous shared spectrum in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network OPs IP services. The OPs IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna sub-arrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected CCs using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or may be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or discrete Fourier transform-spread-OFDM (DFT-s-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing may be inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that may support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink CCs and one or more uplink CCs according to a carrier aggregation configuration. Carrier aggregation may be used with both FDD and TDD CCs.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one OP is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds (μs)). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 of a first OP may determine a priority for the first OP during a TxOP of a shared or unlicensed channel. The priority may be lower than a priority of a second OP for the TxOP. Base station 105 may transmit a tentative grant to a UE 115 (prior to the TxOP) to schedule communications between the base station 105 and the UE 115 over resources of the TxOP. The transmitting device of the first OP (e.g., either base station 105 of a first OP or UE 115 of the first OP) may monitor a contention window of the TxOP for reservation signals communicated by devices attempting to access the TxOP, which may be devices associated with the second OP. The reservation signals may reserve resources of the shared or unlicensed channel. If the transmitting device of the first OP determines that communicating over the shared or unlicensed channel may interfere with communications of the devices that have gained access to the TxOP (e.g., based on information indicated by the reservation signals), the transmitting device may refrain from communicating over the resources indicated by the tentative grant. If the transmitting device of the first OP determines that communicating over the shared or unlicensed channel may not interfere with communications of the devices that have gained access to the TxOP (e.g., based on information indicated by the reservation signals), the transmitting device may communicate in accordance with the tentative grant (e.g., the transmitting device may transmit over resources of the shared or unlicensed channel indicated by the tentative grant).

Figure 2:
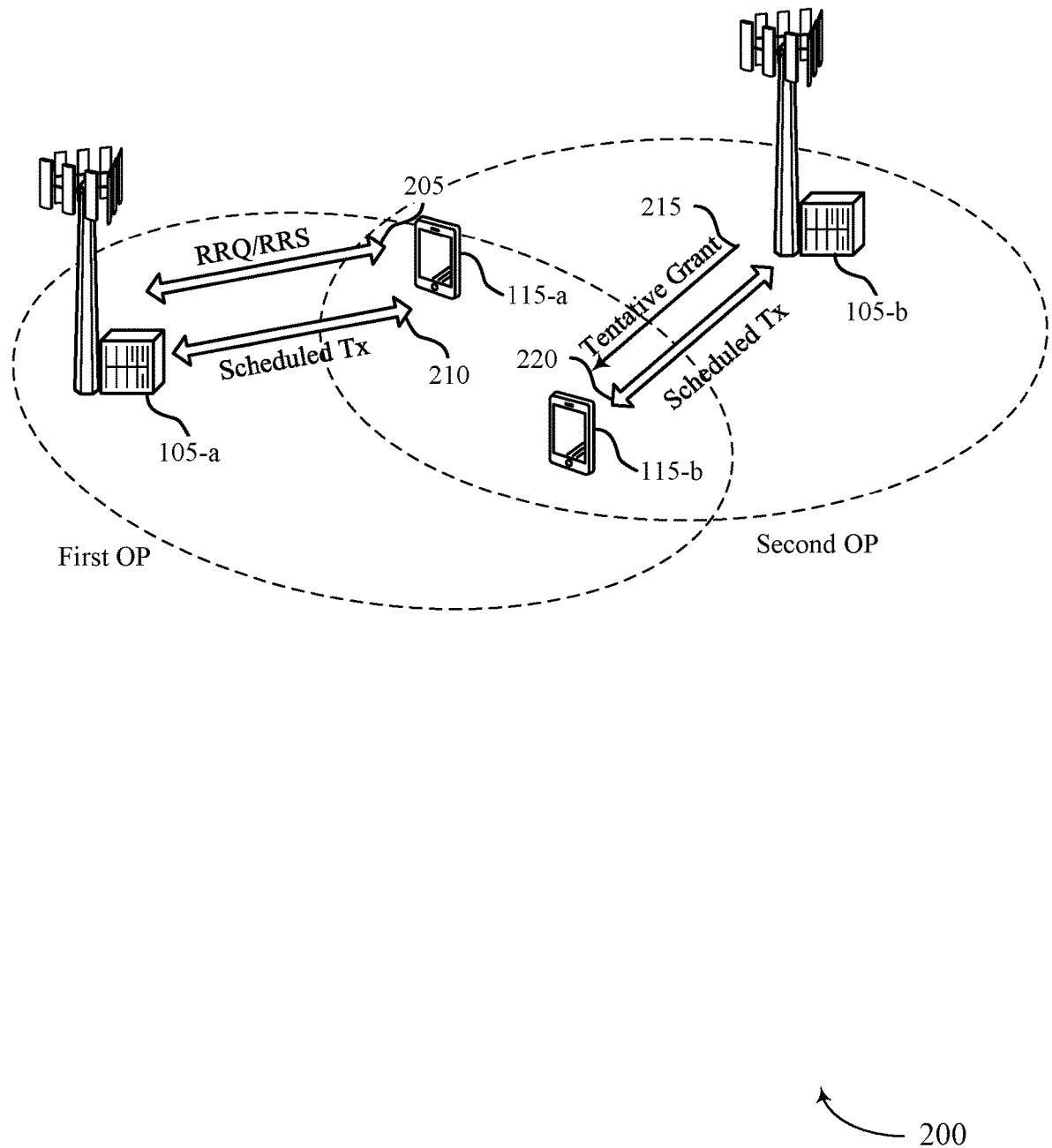
FIG. 2 illustrates an example of a wireless communications system that supports synchronous shared spectrum in accordance with aspects of the present disclosure.

FIG. 2 illustrates an example of a wireless communications system 200 that supports synchronous shared spectrum in accordance with aspects of the present disclosure. In some examples, wireless communications system 200 may implement aspects of wireless communications system 100. Wireless communications system 200 may include a base station 105-a, a base station 105-b, a UE 115-a, and a UE 115-b. Wireless communications system 200 may be a heterogeneous system that includes different OPs. For example, base station 105-a and UE 115-a may belong to a first OP. Base station 105-b and UE 115-b may belong to a second OP. Although shown as separate entities, base station 105-a and base station 105-b may be co-located (e.g., multiple OPs may be supported by an individual base station 105). Additionally or alternatively, UE 115-a and UE 115-b may also be co-located (e.g., an individual UE 115 may support multiple OPs).

Base stations 105 and UEs 115 of different OPs may attempt to gain access to a shared or unlicensed channel. For example, devices of a first OP (e.g., base station 105-a and UE 115-a) may contend for access to the same shared or unlicensed channel as devices of a second OP (e.g., base station 105-b and UE 115-b). However, as resources of the channel are limited, issues may arise concerning fairness of access as well as overhead and latency associated with contention techniques for access to the channel.

In some examples, devices of the first and second OP may have different priorities for accessing the shared or unlicensed channel. Priorities may be assigned on a TxOP basis for the channel. The priorities may be provided by a packet core element (e.g., an MME), or the like, to base stations 105 of the wireless communications system 200. The base stations 105 may, in turn, communicate the priorities of one or more OPs to the UEs 115 of the wireless communications system 200. In some aspects, priorities may alternate between OPs of the wireless communications system 200 for a given TxOP. For example, devices of a first OP may have a higher priority for a first TxOP of the channel, and may have a lower priority for a subsequent TxOP for the channel. Similarly, devices of a second OP may have a lower priority for the first TxOP and a higher priority for the subsequent TxOP.

Devices of an OP with a high priority may have a preferential attempt at accessing the channel during a given TxOP. For example, base station 105-a and UE 115-a may have a higher priority than base station 105-b and UE 115-b for a first TxOP. As such, the transmitting device associated with the higher priority (e.g., either base station 105-a or UE 115-a) may implement a contention-based technique to gain access to the channel. For example, base station 105-a may have downlink communications scheduled for UE 115-a. Base station 105-a may transmit an RRQ in a contention window over communication link 205 to the UE 115-a in order to reserve resources of the channel. UE 115-a may respond with a reservation response (RRS) in the contention window over communication link 205 acknowledging the reservation of the resources. Base station 105-a may then transmit downlink data to UE 115-a over the reserved resources via communication link 210. In some cases, the reservation signals (e.g., RRQ and RRS) may be examples of signaling that a transmitting device may monitor a channel for and such signals may be examples of request to send (RTS) or clear to send (CTS) signaling.

In another example, UE 115-a may have uplink communications scheduled for base station 105-a. UE 115-a may transmit an RRQ in the contention window over communication link 205 to base station 105-a to reserve resources of the channel. Base station 105-a may respond with an RRS in the contention window over communication link 205 acknowledging the reservation of the resources. UE 115-a may then transmit uplink data via communication link 210 to base station 105-a over the reserved resources.

Communications of lower priority devices over the shared or unlicensed channel may be defer communications in a TxOP based on scheduled communications of higher priority devices. For example, UE 115-b may have uplink data queued for transmitting to base station 105-b. As the OP of base station 105-b and UE 115-b may have a lower priority than the OP of base station 105-a and UE 115-a during the TxOP, base station 105-b may transmit a tentative grant 215 to UE 115-b for communicating the queued data over resources of the channel. The communications scheduled by the tentative grant 215 may be subject to whether the scheduled communications may interfere with communications scheduled by higher priority devices (e.g., base station 105-a and UE 115-a) over the shared or unlicensed channel.

In other examples, devices that have gained access to the TxOP may have further data to communicate and may utilize a tentative grant 215 after communicating during the TxOP. For example, base station 105-a may win access to the shared channel during the TxOP and may communicate with UE 115-a. At an end of the TxOP, base station 105-a may transmit a tentative grant 215 to UE 115-a or another UE 115, the tentative grant 215 scheduling an uplink or downlink transmission in a subsequent TxOP (e.g., a TxOP in which the first OP has lower priority than the second OP). In such instances, the transmitting device (e.g., the base station 105-a for a downlink grant or the UE 115-a (or another UE 115) for an uplink grant) may monitor a contention window of the subsequent TxOP to determine whether to perform the uplink or downlink transmission during resources of the subsequent TxOP indicated by the tentative grant 215.

A transmitting device with a lower priority OP may monitor reservation signals of the higher priority devices. In the above example, UE 115-b may monitor reservation signals transmitted by devices with a higher priority OP, for example, RRQ and RRS transmitted in the contention window over communication link 205 by base station 105-a and UE 115-a. In some cases, the monitoring may be a CCA, and received power thresholds of the CCA may be indicated in control information (e.g., downlink control information (DCI) or in a MAC control element (MAC-CE)). Additionally or alternatively, the contention window may be a symbol in length. If the communications scheduled by the tentative grant 215 interfere with communications scheduled by the monitored reservation signals, UE 115-b may refrain from communicating over the channel. If the communications scheduled by the tentative grant 215 do not interfere with communications scheduled by the monitored reservation signals, UE 115-b may transmit the queued uplink data over communication link 220 using the channel.

The tentative grant 215 may schedule either uplink or downlink communications. In some examples, the tentative grant 215 schedules downlink communications. However, it should be noted that the tentative grant 215 may also schedule uplink communications. In some examples, UE 115-b may monitor the contention window over communication link 205 for RRQ or RRS. In such examples, UE 115-b may then determine whether communicating over the shared channel will interfere with communications of devices from the first OP.

As low priority devices may not communicate reservation signals, the techniques described herein may allow for contention windows having a size below a threshold (e.g., a minimization of contention windows) and therefore may decrease overhead and latency in the wireless communications system 200 (e.g., by 64 µs of overhead). Further, alternating priorities for different TxOPs in the channel may allow for a fairer distribution of access to the channel.

Figure 3:
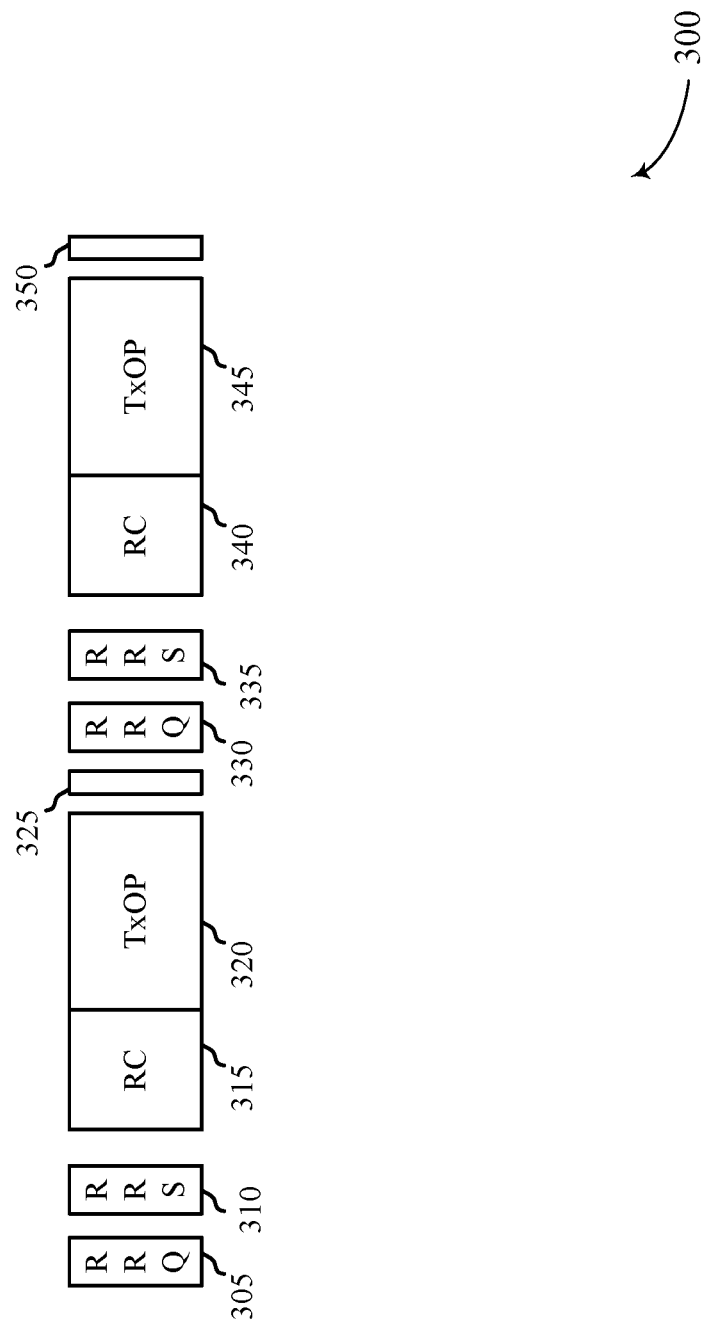
FIG. 3 illustrates an example of a communication scheme that supports synchronous shared spectrum in accordance with aspects of the present disclosure.

FIG. 3 illustrates an example of a communication scheme 300 that supports synchronous shared spectrum in accordance with aspects of the present disclosure. In some examples, communication scheme 300 may implement aspects of wireless communications system 100 or 200. Communication scheme 300 may be include communications between a base station and a UE of a first OP, and between a base station and a UE of a second OP, which may be examples of the respective devices as described herein.

Priority for different TxOPs in the communication scheme 300 may be based on associated OPs. For example, a first OP may be of higher priority than a second OP for the first TxOP

320. Priorities may switch, however, for the second TxOP 345. Following the above example, the first OP may have a low priority and the second OP may have a high priority for the second TxOP 345. Priorities may be further determined as discussed with reference to FIG. 2 and additional OPs may be supported having priorities relative to the first and second OPs in given TxOPs.

A high priority OP device may have data transmissions pending and may wish to access the channel during the first TxOP 320. For example, either first OP base station or first OP UE may have data communications queued for transmission. The first OP device with queued data communications may transmit an RRQ in an RRQ window 305 to the first OP receiving device. The RRQ may indicate resources of a shared or unlicensed channel to use for transmitting the queued data. The first OP receiving device may respond by transmitting an RRS in an RRS window 310 to the first OP transmitting device. The RRS may act as an acknowledgement or as authorization to transmit the queued data. Both the RRQ window 305 and the RRS window 310 may each be one symbol in length (or may vary in length), and the combination of the RRQ window 305 and the RRS window 310 may be referred to as a contention window.

Devices that won access to the first TxOP 320 may implement a coordinated rate control (RC) procedure. For example, first OP base station and first OP UE may transmit coordinated RC signals in a coordinated RC window 315 after communicating the RRQ and the RRS. In some examples, the coordinated RC signals may be pilot sequences. The coordinated RC signals may be communicated between first OP base station and first OP UE (and other devices including lower priority devices that have won contention to the channel during first TxOP 320), and may be used to determine or coordinate modulation and coding schemes (MCSs) for the data to be communicated during the first TxOP 320. In some cases, the coordinated RC procedure is based on a common interference management resource (IMR) configuration. In some cases, the IMR configuration may be blank (e.g., resources may be left blank to reduce interference) and receivers from the high priority OP may be protected by an associated CCA threshold (e.g., 72 dBm). The first OP transmitting device may then transmit the data communications in the first TxOP 320 and over the resources of the shared or unlicensed channel indicated in the RRQ or RRS.

In some cases, the first OP transmitting device may detect the coordinated RC signals (e.g., pilot sequences) transmitted from a tentative transmitting device, where the coordinated RC signals may indicate RC information (e.g., for estimating interference from IMR). In addition, the coordinated RC signals may indicate that the tentative transmitting device has performed LBT.

In some cases, the first OP base station may determine that additional communications are pending after communicating over the first TxOP 320. For example, the resources to communicate in the first TxOP 320 may be inadequate to transmit the entirety of the queued data, or new communications may be queued subsequent to the transmission of RRQ and RRS. In such instances, the first OP base station may transmit a tentative grant 325 to the first OP UE (which may be different from or the same as the UE that received the data communications during the first TxOP). The tentative grant 325 may be transmitted using time-frequency resources of the first TxOP 320 or may be transmitted subsequent to the first TxOP. In some examples, the tentative grant 325 may be one symbol reserved in the first TxOP 320. The tentative grant 325 may indicate, to the first OP UE, resources of the second TxOP 345 that may be used for transmission of the additional pending data. Additionally or alternatively, the tentative grant 325 may include an identification field (e.g., a one-bit field) which may indicate that the tentative grant 325 is tentative and subject to transmission of other devices during the second TxOP 345. That is, the tentative grant 325 may include an indication that it is not an explicit grant for resources during the second TxOP 345 (e.g., the tentative grant 325 may indicate that the first OP has a low priority for the second TxOP 345).

In some cases, the device receiving the tentative grant 325 may determine that the tentative grant 325 is voided by the tentative transmitting device, and may not transmit HARQ feedback information (e.g., a HARQ feedback response such as an acknowledgement (ACK) or negative ACK (NACK)).

The first OP transmitting device may then monitor the RRQ window 330 or the RRS window 335 for the second TxOP 345. Since the second OP may have higher priority for the second TxOP 345, devices of the second OP may attempt to gain access to the channel by transmitting RRQ and RRS in RRQ window 330 and RRS window 335, respectively. As the first OP may have a lower priority for the second TxOP 345, the first OP transmitting device may monitor for RRQ or RRS to determine whether communicating over the second TxOP 345 will interfere with communications of devices associated with the higher priority OP. For example, the first OP transmitting device may perform a CCA procedure during the RRQ window 330 and the RRS window 335. If the first OP transmitting device determines that communicating in the second TxOP 345 will not interfere with high priority communications, then the first OP transmitting device may transmit coordinated RC signals in the coordinated RC window 340 to determine an MCS for transmissions in the second TxOP 345. The first OP transmitting device may then transmit the pending data over the second TxOP 345 via resources indicated in the tentative grant 325. The first OP receiving device may monitor, and subsequently receive the pending communications over the resources indicated in the tentative grant 325.

If the first OP transmitting device determines that communicating in the second TxOP 345 will interfere with high priority communications, then the first OP transmitting device may refrain from transmitting the further pending communications. In some cases, the first OP transmitting device may wait for another TxOP associated with the first TxOP 320 (e.g., where the first OP has a high priority).

In some examples, the second OP base station may determine that communications are further pending after the second TxOP 345. The second OP base station may transmit a tentative grant 350 to the second OP UE for another TxOP subsequent to the second TxOP 345. The tentative grant 350 may be within resources of the second TxOP 345. The tentative grant 350 may indicate to the second OP UE of resources of the another TxOP that may be used for transmission of pending data.

In some examples, the tentative grants 325, 350 may include additional information used in communications. For example, the tentative grants 325, 350 may include identification information, such as the tentative transmitter ID and the tentative receiver ID. The tentative grants 325, 350 may additionally or alternatively include tentative radio resources for data transmission, a CCA threshold, a number of pilot sequences (e.g., the number of pilot sequences defined as a tentative rank), the IMR (e.g., for RC), and HARQ feedback information (e.g., when to send ACK/NACK feedback).

In addition, the tentative grants 325, 350 may include a threshold rank/CQI for data transmission. A tentative receiving device may transmit feedback to a tentative transmitting device, where the feedback may include information such as an indication of portions of the tentative radio resources that satisfy the rank/CQI threshold. In cases where the tentative receiving device does not transmit feedback to the tentative transmitting device, the tentative transmitting device may determine that one or more of the tentative grants 325, 350 may be voided by the tentative receiving device. In some cases, the tentative transmitting device may transmit data over the tentative radio resources allocated for the feedback of the tentative receiving device.

Figure 4:
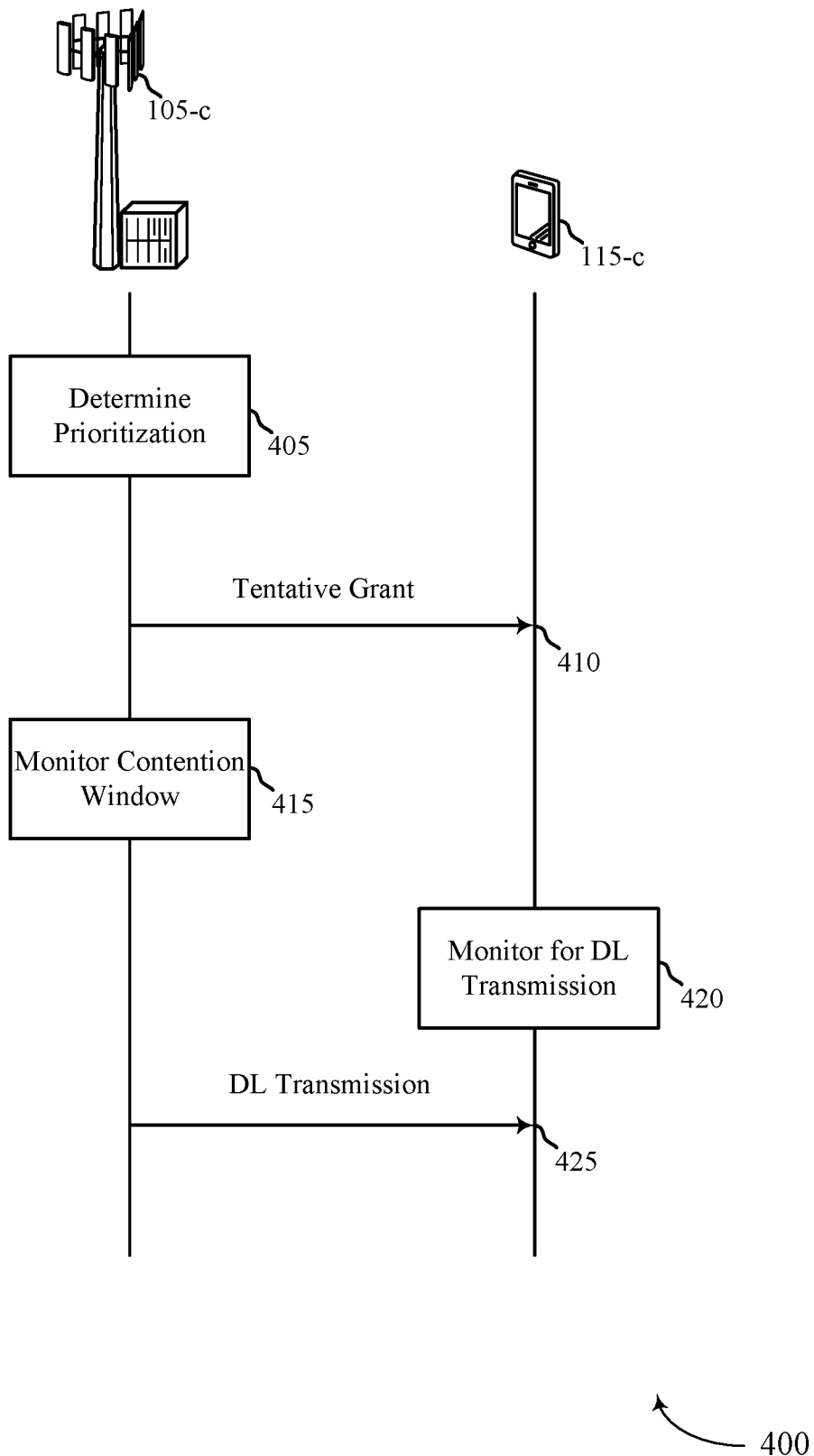
FIG. 4 illustrates an example of a process flow that supports synchronous shared spectrum in accordance with aspects of the present disclosure.

FIG. 4 illustrates an example of a process flow 400 that supports synchronous shared spectrum in accordance with aspects of the present disclosure. In some examples, process flow 400 may implement aspects of wireless communications systems 100 or 200 and may support communications according to a communication scheme 300. Process flow 400 may include a base station 105-c associated with a first network OP and a UE 115-c, which may be examples of the corresponding devices described herein.

At 405, base station 105-c may determine a prioritization of the first network OP for a first TxOP and a second TxOP. The first network OP may have a higher priority than a second network OP during the first TxOP and the second network OP may have a higher priority than the first network OP during the second TxOP.

At 410, base station 105-c may transmit, and UE 115-c may receive, a tentative grant based at least in part on the determined prioritization. The tentative grant may be transmitted over a channel of a shared radio frequency spectrum band using resources within the first TxOP associated with tentative grants. The tentative grant may schedule a downlink data transmission using the channel over a set of resources of the second TxOP subsequent to the first TxOP.

At 415, base station 105-c may monitor, during a contention window of the second TxOP, for one or more contention messages from a device associated with the second network OP.

At 420, UE 115-c may monitor the set of resources of the second TxOP for the downlink data transmission from the base station. The set of resources monitored by UE 115-c may be indicated by the tentative grant.

At 425, base station 105-c may perform the downlink data transmission based at least in part on the tentative grant and a result of the monitoring for one or more contention messages.

Figure 5:
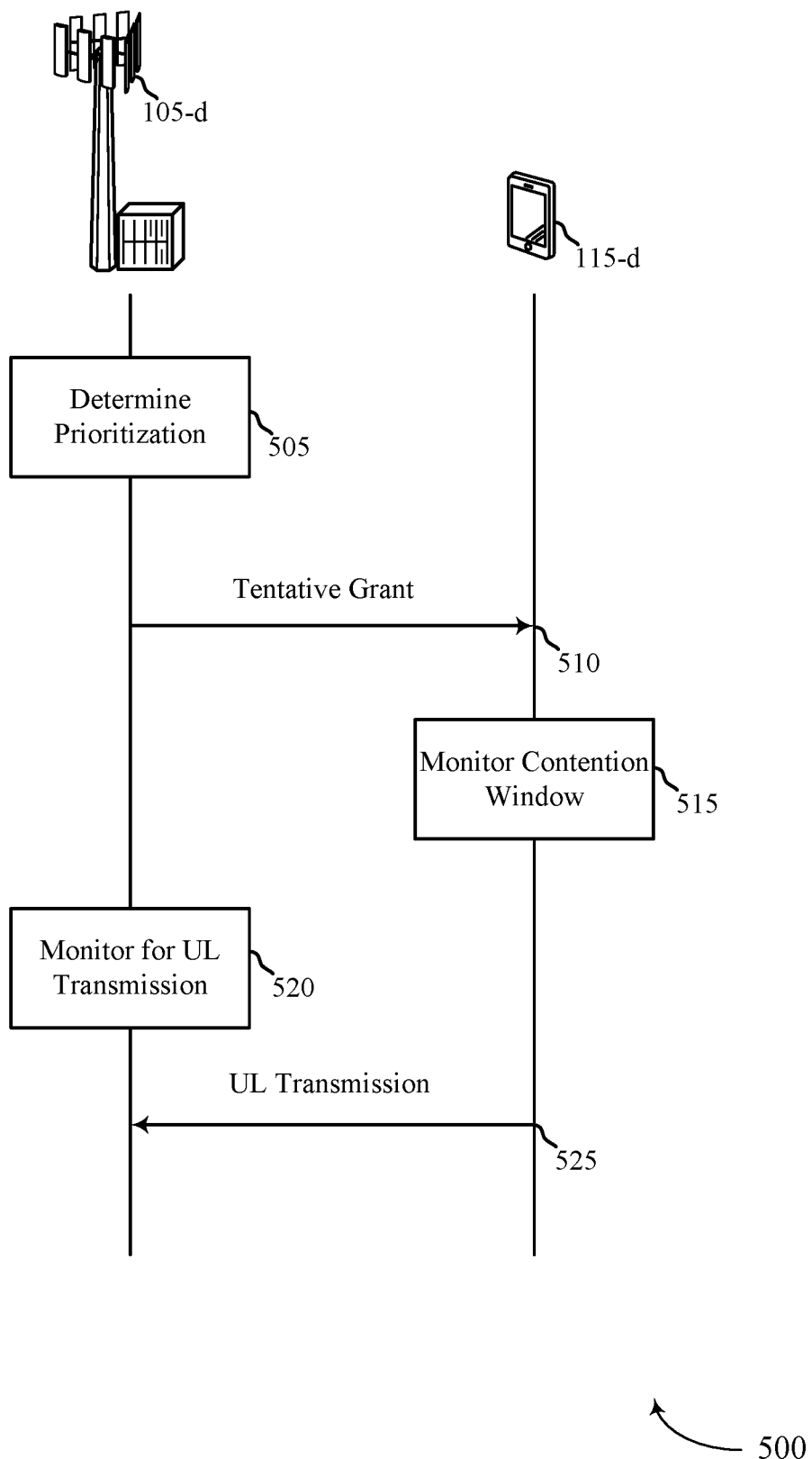
FIG. 5 illustrates an example of a process flow that supports synchronous shared spectrum in accordance with aspects of the present disclosure.

FIG. 5 illustrates an example of a process flow 500 that supports synchronous shared spectrum in accordance with aspects of the present disclosure. In some examples, process flow 500 may implement aspects of wireless communications systems 100 or 200 and may implement communication scheme 300. Process flow 500 may include a base station 105-d associated with a first network OP and a UE 115-d, each of which may be examples of the corresponding devices described herein.

At 505, base station 105-d may determine a prioritization of the first network OP for a first TxOP and a second TxOP. The first network OP may have a higher priority than a second network OP during the first TxOP and the second network OP may have a higher priority than the first network OP during the second TxOP.

At 510, base station 105-d may transmit, and UE 115-d may receive, a tentative grant based at least in part on the determined prioritization. The tentative grant may be transmitted over a channel of a shared radio frequency spectrum band using resources within the first TxOP associated with tentative grants. The tentative grant may schedule an uplink data transmission using the channel over a set of resources of the second TxOP subsequent to the first TxOP.

At 515, UE 115-d may monitor, during a contention window of the second TxOP, for one or more contention messages from a device associated with the second network OP.

At 520, base station 105-d may monitor the set of resources of the second TxOP for the uplink data transmission from the base station. The set of resources monitored by base station 105-d may be indicated by the tentative grant.

At 525, UE 115-d may perform the uplink data transmission based at least in part on the tentative grant and a result of the monitoring for one or more contention messages.

Figure 6:
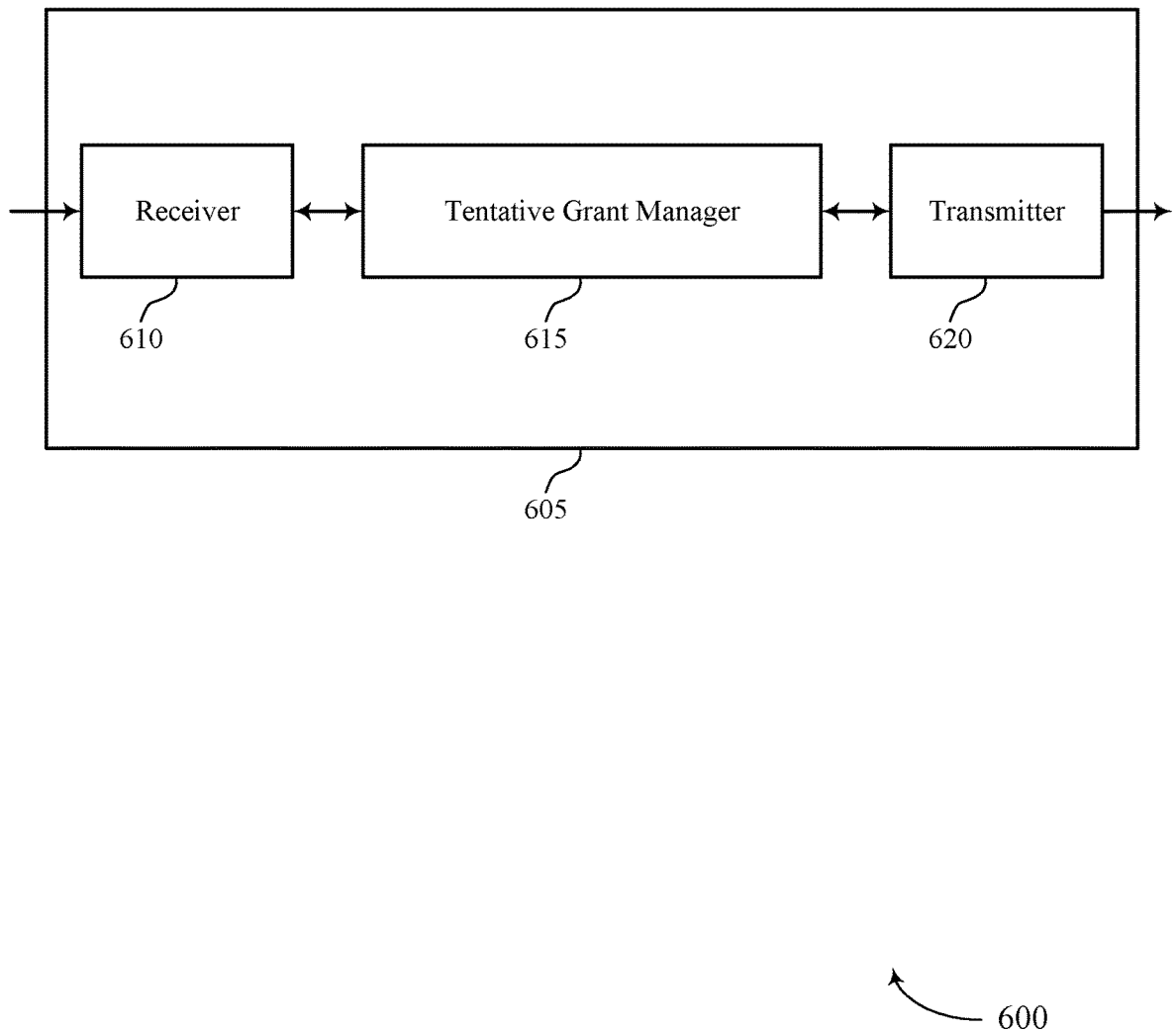
FIGS. 6 and 7 show block diagrams of devices that support synchronous shared spectrum in accordance with aspects of the present disclosure.

FIG. 6 shows a block diagram 600 of a device 605 that supports synchronous shared spectrum in accordance with aspects of the present disclosure. The device 605 may be an example of aspects of a UE 115 as described herein. The device 605 may include a receiver 610, a tentative grant manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to synchronous shared spectrum, etc.). Information may be passed on to other components of the device 605. The receiver 610 may be an example of aspects of the transceiver 920 described with reference to FIG. 9. The receiver 610 may utilize a single antenna or a set of antennas.

The tentative grant manager 615 may receive a tentative grant from a base station associated with a first network OP over a channel of a shared radio frequency spectrum band using resources within a first TxOP associated with tentative grants, where the tentative grant schedules a downlink data transmission using the channel over a set of resources of a second TxOP subsequent to the first TxOP and monitor the set of resources of the second TxOP for the downlink data transmission from the base station, where the set of resources is indicated by the tentative grant.

The tentative grant manager 615 may also receive a tentative grant from a base station associated with a first network OP over a channel of a shared radio frequency spectrum band using resources within a first TxOP associated with tentative grants, where the tentative grant schedules an uplink data transmission using the channel over a set of resources of a second TxOP subsequent to the first TxOP, monitor, during a contention window of the second TxOP, for one or more contention messages from a device associated with a second network OP, and perform the uplink data transmission based on the tentative grant and a result of the monitoring. The tentative grant manager 615 may be an example of aspects of the tentative grant manager 910 described herein.

The tentative grant manager 615, or its sub-components, may be implemented in hardware, code (e.g., software or firmware) executed by a processor, or any combination thereof. If implemented in code executed by a processor, the functions of the tentative grant manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The tentative grant manager 615, or its sub-components, may be physically located at various positions, including being distributed such that portions of functions are implemented at different physical locations by one or more physical components. In some examples, the tentative grant manager 615, or its sub-components, may be a separate and distinct component in accordance with various aspects of the present disclosure. In some cases, the tentative grant manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, tentative grant manager 615 may be implemented as an integrated circuit or chipset for a mobile device modem, and the receiver 610 and transmitter 620 may be implemented as analog components (e.g., amplifiers, filters, antennas, etc.) coupled with the mobile device modem to enable wireless transmission and reception.

The tentative grant manager 615 as described herein may be implemented to realize one or more potential advantages. Various implementations may reduce the latency and overhead associated with contention-based procedures used to gain access to a shared or unlicensed spectrum band for communications. As a result, a device may reduce its power consumption, and user experience may be improved. In one example, tentative grant manager 615 may schedule a transmission using a tentative grant based on the priorities of a number of other transmissions in the network. In some cases, the tentative grant may provide improved flexibility for capturing and reserving a channel used for communication. The tentative grant may also provide fair channel access for devices in cases where transmission priorities for the devices vary for different TxOPs.

Based on implementing the contention-based techniques described herein, one or more processors of the device 605 (e.g., processor(s) controlling or incorporated with one or more of receiver 610, communications manager 615, and transmitter 620) may reduce an amount of time to effectively capture a channel and communicate over an allocated TxOP.

Figure 7:
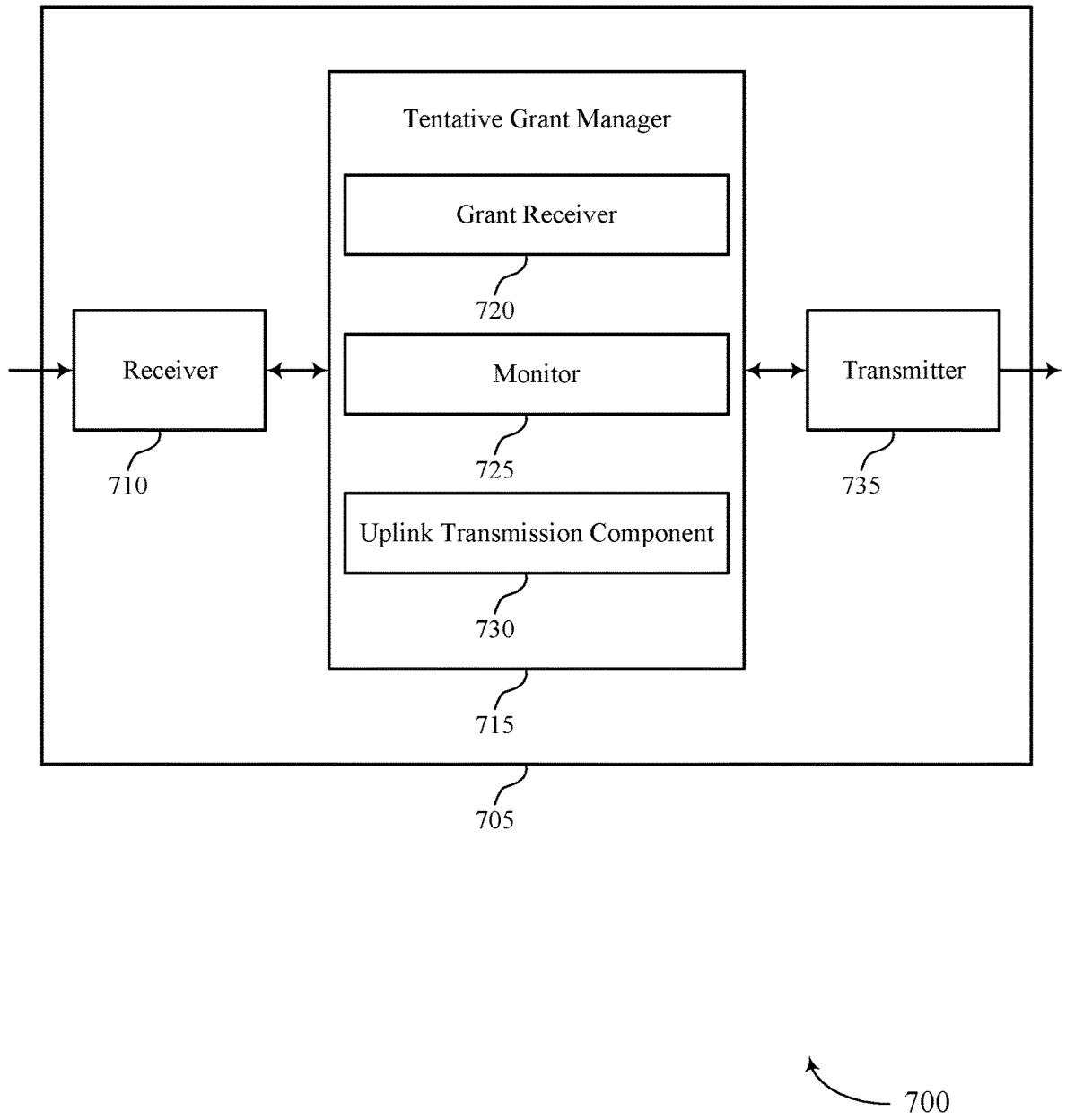

FIG. 7 shows a block diagram 700 of a device 705 that supports synchronous shared spectrum in accordance with aspects of the present disclosure. The device 705 may be an example of aspects of a device 605 or a UE 115 as described herein. The device 705 may include a receiver 710, a tentative grant manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to synchronous shared spectrum, etc.). Information may be passed on to other components of the device 705. The receiver 710 may be an example of aspects of the transceiver 920 described with reference to FIG. 9. The receiver 710 may utilize a single antenna or a set of antennas.

The tentative grant manager 715 may be an example of aspects of the tentative grant manager 615 as described herein. The tentative grant manager 715 may include a grant receiver 720, a monitor 725, and an uplink transmission component 730. The tentative grant manager 715 may be an example of aspects of the tentative grant manager 910 described herein.

The grant receiver 720 may receive a tentative grant from a base station associated with a first network OP over a channel of a shared radio frequency spectrum band using resources within a first TxOP associated with tentative grants, where the tentative grant schedules a downlink data transmission using the channel over a set of resources of a second TxOP subsequent to the first TxOP.

The monitor 725 may monitor the set of resources of the second TxOP for the downlink data transmission from the base station, where the set of resources is indicated by the tentative grant.

The grant receiver 720 may receive a tentative grant from a base station associated with a first network OP over a channel of a shared radio frequency spectrum band using resources within a first TxOP associated with tentative grants, where the tentative grant schedules an uplink data transmission using the channel over a set of resources of a second TxOP subsequent to the first TxOP.

The monitor 725 may monitor, during a contention window of the second TxOP, for one or more contention messages from a device associated with a second network OP.

The uplink transmission component 730 may perform the uplink data transmission based on the tentative grant and a result of the monitoring.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
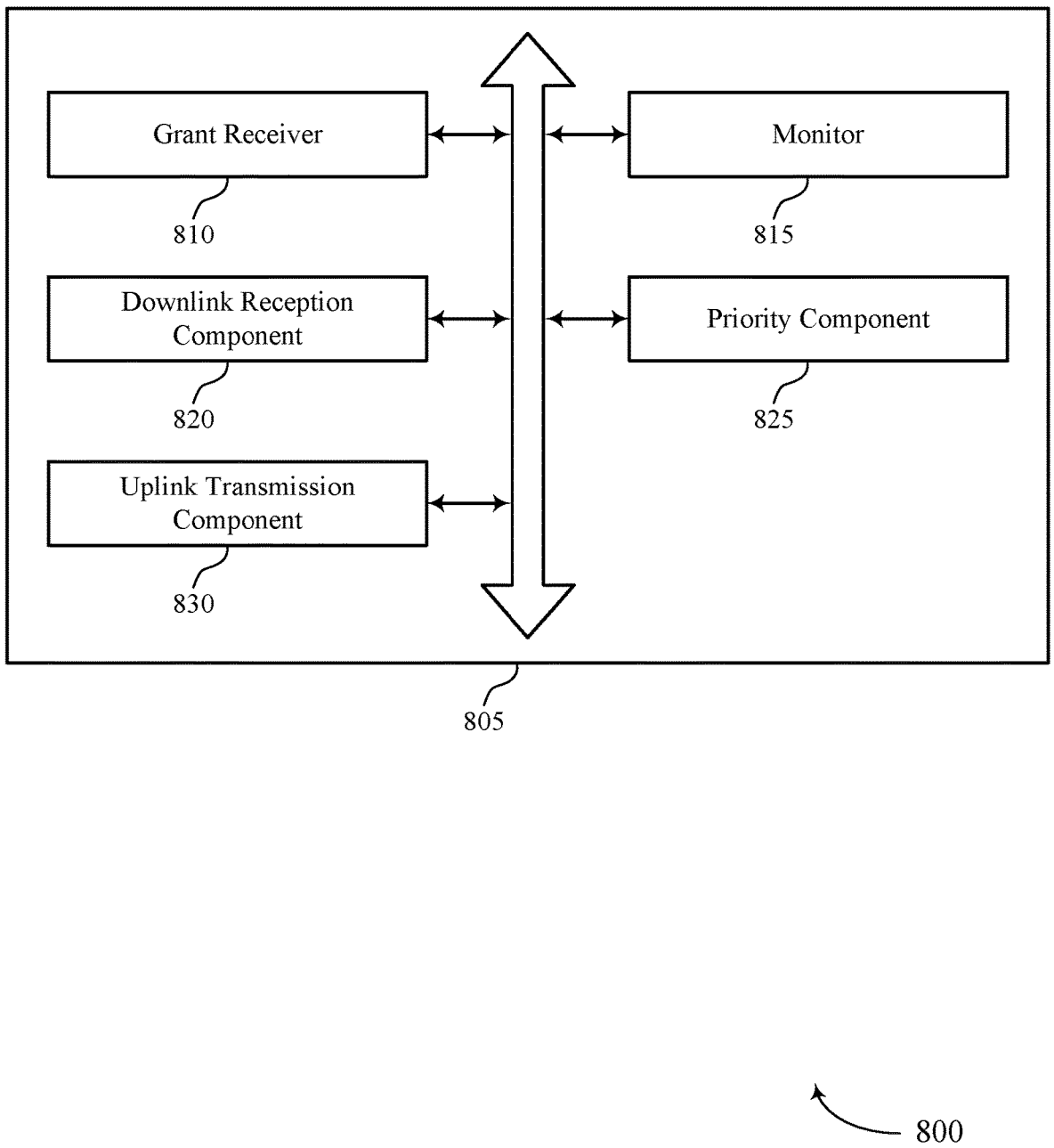
FIG. 8 shows a block diagram of a tentative grant manager that supports synchronous shared spectrum in accordance with aspects of the present disclosure.

FIG. 8 shows a block diagram 800 of a tentative grant manager 805 that supports synchronous shared spectrum in accordance with aspects of the present disclosure. The tentative grant manager 805 may be an example of aspects of a tentative grant manager 615, a tentative grant manager 715, or a tentative grant manager 910 described herein. The tentative grant manager 805 may include a grant receiver 810, a monitor 815, a downlink reception component 820, a priority component 825, and an uplink transmission component 830. Each of these modules may communicate, directly or indirectly, with one another (e.g., via one or more buses).

The grant receiver 810 may receive a tentative grant from a base station associated with a first network OP over a channel of a shared radio frequency spectrum band using resources within a first TxOP associated with tentative grants, where the tentative grant schedules a downlink data transmission using the channel over a set of resources of a second TxOP subsequent to the first TxOP.

In some examples, the grant receiver 810 may receive a tentative grant from a base station associated with a first network OP over a channel of a shared radio frequency spectrum band using resources within a first TxOP associated with tentative grants, where the tentative grant schedules an uplink data transmission using the channel over a set of resources of a second TxOP subsequent to the first TxOP. In some cases, the grant receiver 810 may receive a one-bit indicator field that conveys an indication of the tentative grant. In some aspects, the grant receiver 810 may receive the tentative grant over a reserved symbol within the first TxOP.

The monitor 815 may monitor the set of resources of the second TxOP for the downlink data transmission from the base station, where the set of resources is indicated by the tentative grant. In some examples, the monitor 815 may monitor, during a contention window of the second TxOP, for one or more contention messages from a device associated with a second network OP. In some cases, the monitor 815 may determine that the second TxOP is available for communication based on the monitoring. In some aspects, the monitor 815 may determine that the second TxOP is unavailable for communication based on the monitoring.

The uplink transmission component 830 may perform the uplink data transmission based on the tentative grant and a result of the monitoring. In some examples, the uplink transmission component 830 may transmit the uplink data transmission to the base station during the second TxOP based on the determination that the second TxOP is available. In some cases, the uplink transmission component 830 may withhold the uplink data transmission until a next TxOP.

The downlink reception component 820 may receive the downlink data transmission from the base station during the second TxOP based on an availability of the second TxOP.

The priority component 825 may determine a prioritization of the first network OP for the first TxOP and the second TxOP, where the first network OP is higher priority than a second network OP during the first TxOP and the second network OP is higher priority than the first network OP during the second TxOP. In some examples, the priority component 825 may determine a prioritization of the first network OP for the first TxOP and the second TxOP, where the first network OP is higher priority than the second network OP during the first TxOP and the second network OP is higher priority than the first network OP during the second TxOP.

Figure 9:
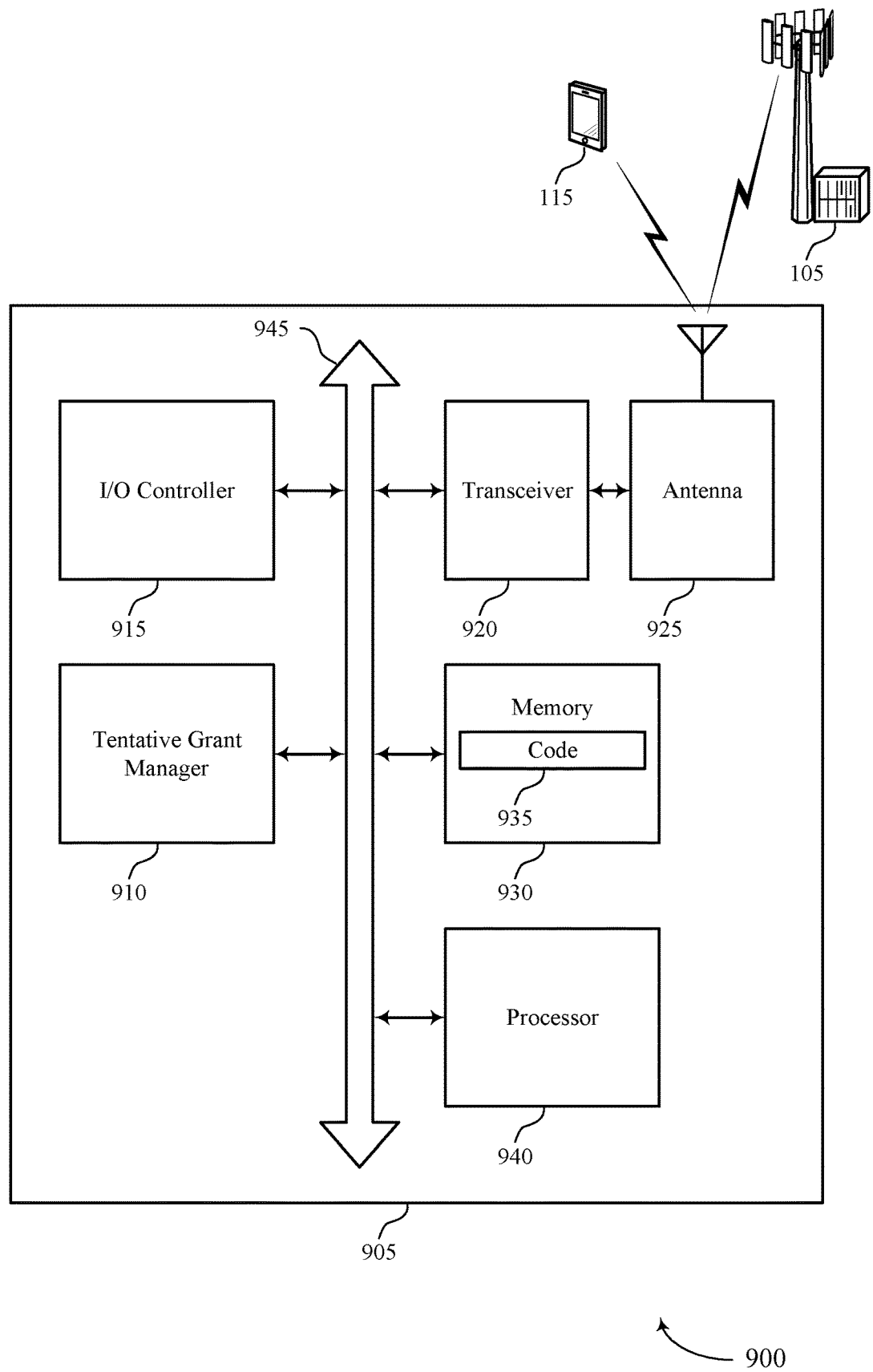
FIG. 9 shows a diagram of a system including a device that supports synchronous shared spectrum in accordance with aspects of the present disclosure.

FIG. 9 shows a diagram of a system 900 including a device 905 that supports synchronous shared spectrum in accordance with aspects of the present disclosure. The device 905 may be an example of or include the components of device 605, device 705, or a UE 115 as described herein. The device 905 may include components for bi-directional voice and data communications including components for transmitting and receiving communications, including a tentative grant manager 910, an I/O controller 915, a transceiver 920, an antenna 925, memory 930, and a processor 940. These components may be in electronic communication via one or more buses (e.g., bus 945).

The tentative grant manager 910 may receive a tentative grant from a base station associated with a first network OP over a channel of a shared radio frequency spectrum band using resources within a first TxOP associated with tentative grants, where the tentative grant schedules a downlink data transmission using the channel over a set of resources of a second TxOP subsequent to the first TxOP and monitor the set of resources of the second TxOP for the downlink data transmission from the base station, where the set of resources is indicated by the tentative grant.

The tentative grant manager 910 may also receive a tentative grant from a base station associated with a first network OP over a channel of a shared radio frequency spectrum band using resources within a first TxOP associated with tentative grants, where the tentative grant schedules an uplink data transmission using the channel over a set of resources of a second TxOP subsequent to the first TxOP, monitor, during a contention window of the second TxOP, for one or more contention messages from a device associated with a second network OP, and perform the uplink data transmission based on the tentative grant and a result of the monitoring.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting synchronous shared spectrum).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
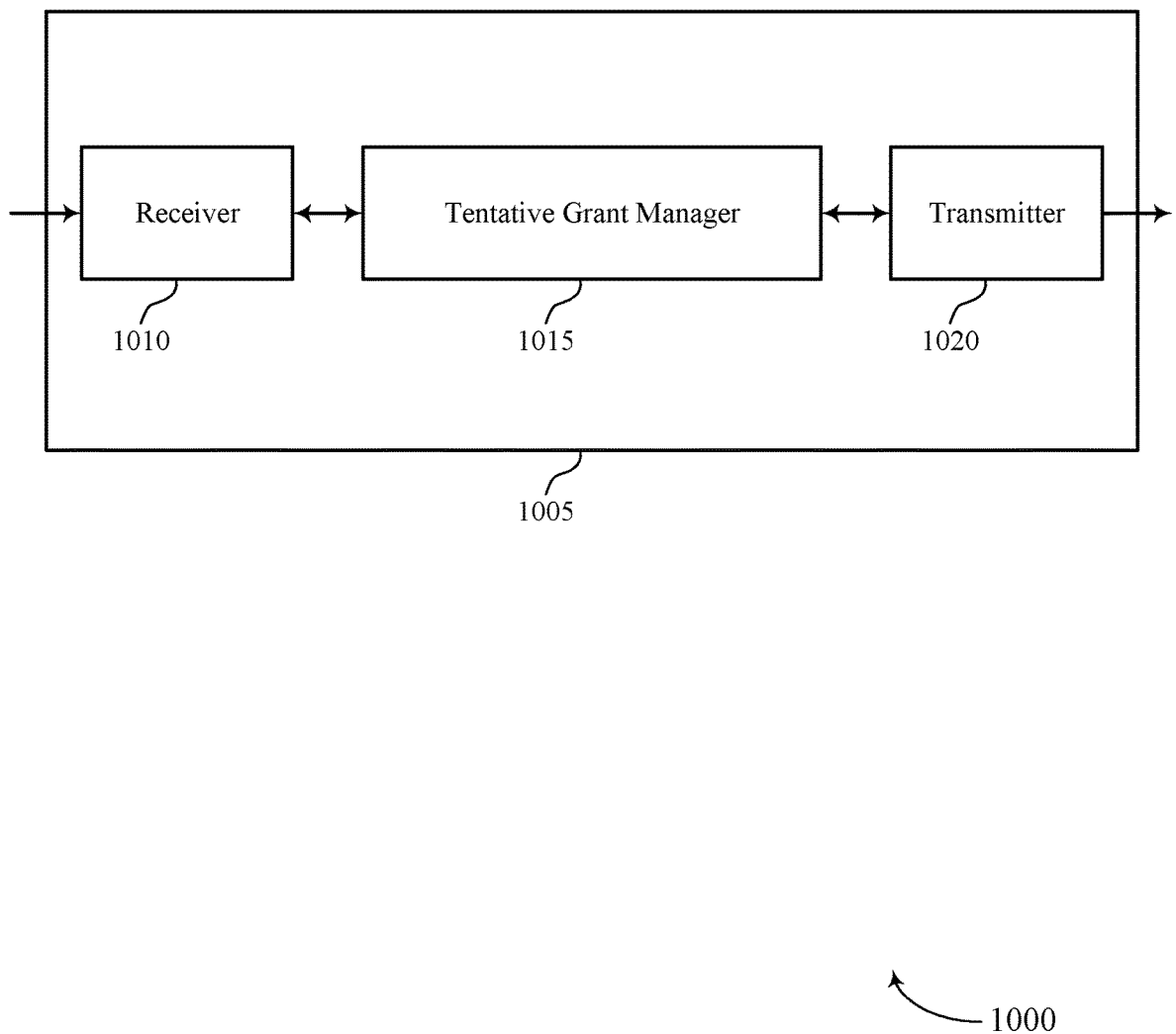
FIGS. 10 and 11 show block diagrams of devices that support synchronous shared spectrum in accordance with aspects of the present disclosure.

FIG. 10 shows a block diagram 1000 of a device 1005 that supports synchronous shared spectrum in accordance with aspects of the present disclosure. The device 1005 may be an example of aspects of a base station 105 as described herein. The device 1005 may include a receiver 1010, a tentative grant manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to synchronous shared spectrum, etc.). Information may be passed on to other components of the device 1005. The receiver 1010 may be an example of aspects of the transceiver 1320 described with reference to FIG. 13. The receiver 1010 may utilize a single antenna or a set of antennas.

The tentative grant manager 1015 may determine a prioritization of the first network OP for a first TxOP and a second TxOP, where the first network OP is higher priority than a second network OP during the first TxOP and the second network OP is higher priority than the first network OP during the second TxOP and transmit a tentative grant to a UE over a channel of a shared radio frequency spectrum band using resources within the first TxOP associated with tentative grants based on the determined prioritization, where the tentative grant schedules a downlink data transmission using the channel over a set of resources of the second TxOP subsequent to the first TxOP. The tentative grant manager 1015 may monitor, during a contention window of the second TxOP, for one or more contention messages from a device associated with the second network OP and perform the downlink data transmission based on the tentative grant and a result of the monitoring.

The tentative grant manager 1015 may also determine a prioritization of the first network OP for a first TxOP and a second TxOP, where the first network OP is higher priority than a second network OP during the first TxOP and the second network OP is higher priority than the first network OP during the second TxOP and transmit a tentative grant to a UE over a channel of a shared radio frequency spectrum band using resources within the first TxOP associated with tentative grants based on the determined prioritization, where the tentative grant schedules an uplink data transmission using the channel over a set of resources of the second TxOP subsequent to the first TxOP. The tentative grant manager 1015 may also monitor the set of resources of the second TxOP for the uplink data transmission from the UE. The tentative grant manager 1015 may be an example of aspects of the tentative grant manager 1310 described herein.

The tentative grant manager 1015, or its sub-components, may be implemented in hardware, code (e.g., software or firmware) executed by a processor, or any combination thereof. If implemented in code executed by a processor, the functions of the tentative grant manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The tentative grant manager 1015, or its sub-components, may be physically located at various positions, including being distributed such that portions of functions are implemented at different physical locations by one or more physical components. In some examples, the tentative grant manager 1015, or its sub-components, may be a separate and distinct component in accordance with various aspects of the present disclosure. In some cases, the tentative grant manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
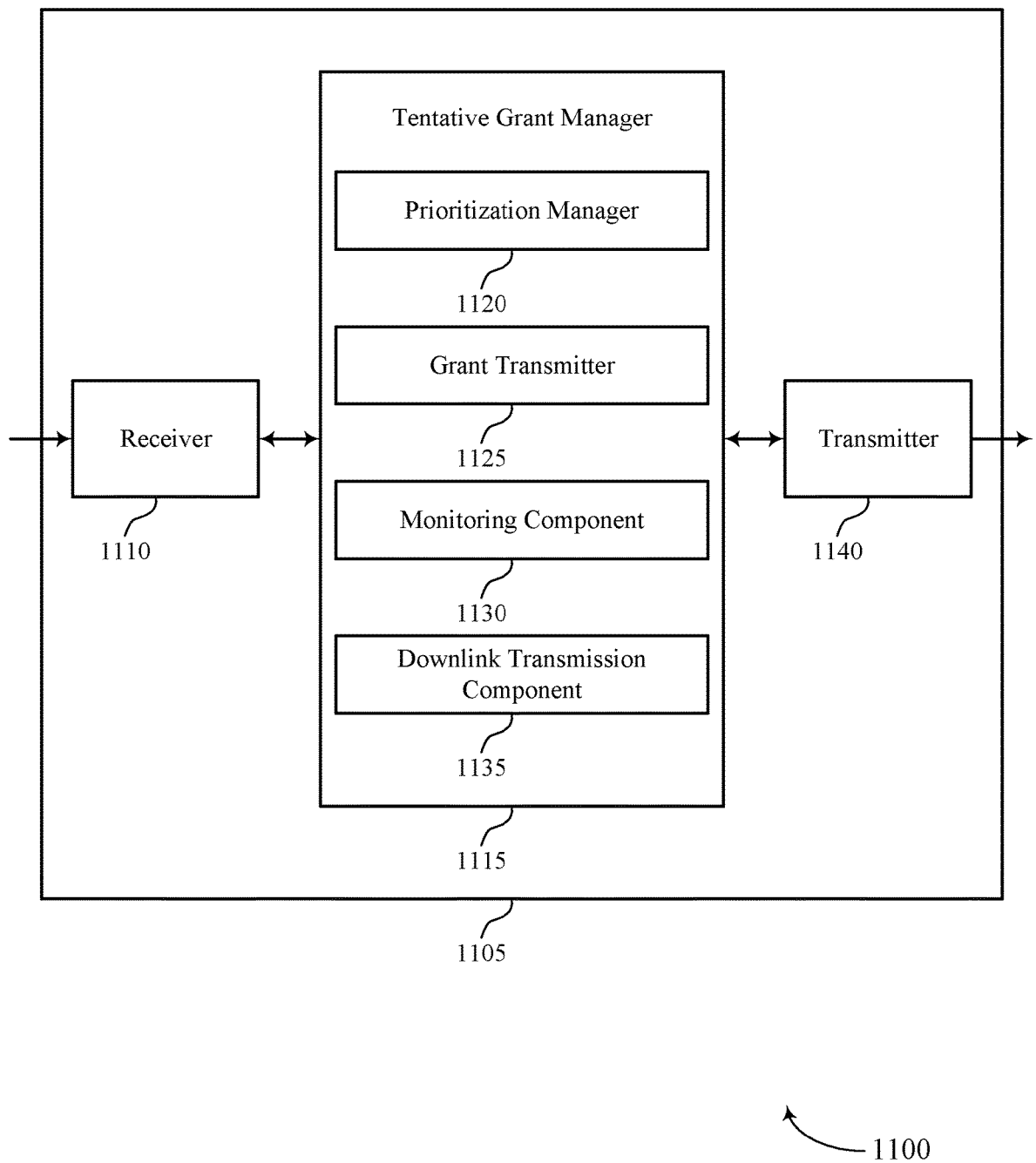

FIG. 11 shows a block diagram 1100 of a device 1105 that supports synchronous shared spectrum in accordance with aspects of the present disclosure. The device 1105 may be an example of aspects of a device 1005 or a base station 105 as described herein. The device 1105 may include a receiver 1110, a tentative grant manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to synchronous shared spectrum, etc.). Information may be passed on to other components of the device 1105. The receiver 1110 may be an example of aspects of the transceiver 1320 described with reference to FIG. 13. The receiver 1110 may utilize a single antenna or a set of antennas.

The tentative grant manager 1115 may be an example of aspects of the tentative grant manager 1015 as described herein. The tentative grant manager 1115 may include a prioritization manager 1120, a grant transmitter 1125, a monitoring component 1130, and a downlink transmission component 1135. The tentative grant manager 1115 may be an example of aspects of the tentative grant manager 1310 described herein.

The prioritization manager 1120 may determine a prioritization of the first network OP for a first TxOP and a second TxOP, where the first network OP is higher priority than a second network OP during the first TxOP and the second network OP is higher priority than the first network OP during the second TxOP.

The grant transmitter 1125 may transmit a tentative grant to a UE over a channel of a shared radio frequency spectrum band using resources within the first TxOP associated with tentative grants based on the determined prioritization, where the tentative grant schedules a downlink data transmission using the channel over a set of resources of the second TxOP subsequent to the first TxOP.

The monitoring component 1130 may monitor, during a contention window of the second TxOP, for one or more contention messages from a device associated with the second network OP.

The downlink transmission component 1135 may perform the downlink data transmission based on the tentative grant and a result of the monitoring.

The prioritization manager 1120 may determine a prioritization of the first network OP for a first TxOP and a second TxOP, where the first network OP is higher priority than a second network OP during the first TxOP and the second network OP is higher priority than the first network OP during the second TxOP.

The grant transmitter 1125 may transmit a tentative grant to a UE over a channel of a shared radio frequency spectrum band using resources within the first TxOP associated with tentative grants based on the determined prioritization, where the tentative grant schedules an uplink data transmission using the channel over a set of resources of the second TxOP subsequent to the first TxOP.

The monitoring component 1130 may monitor the set of resources of the second TxOP for the uplink data transmission from the UE.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
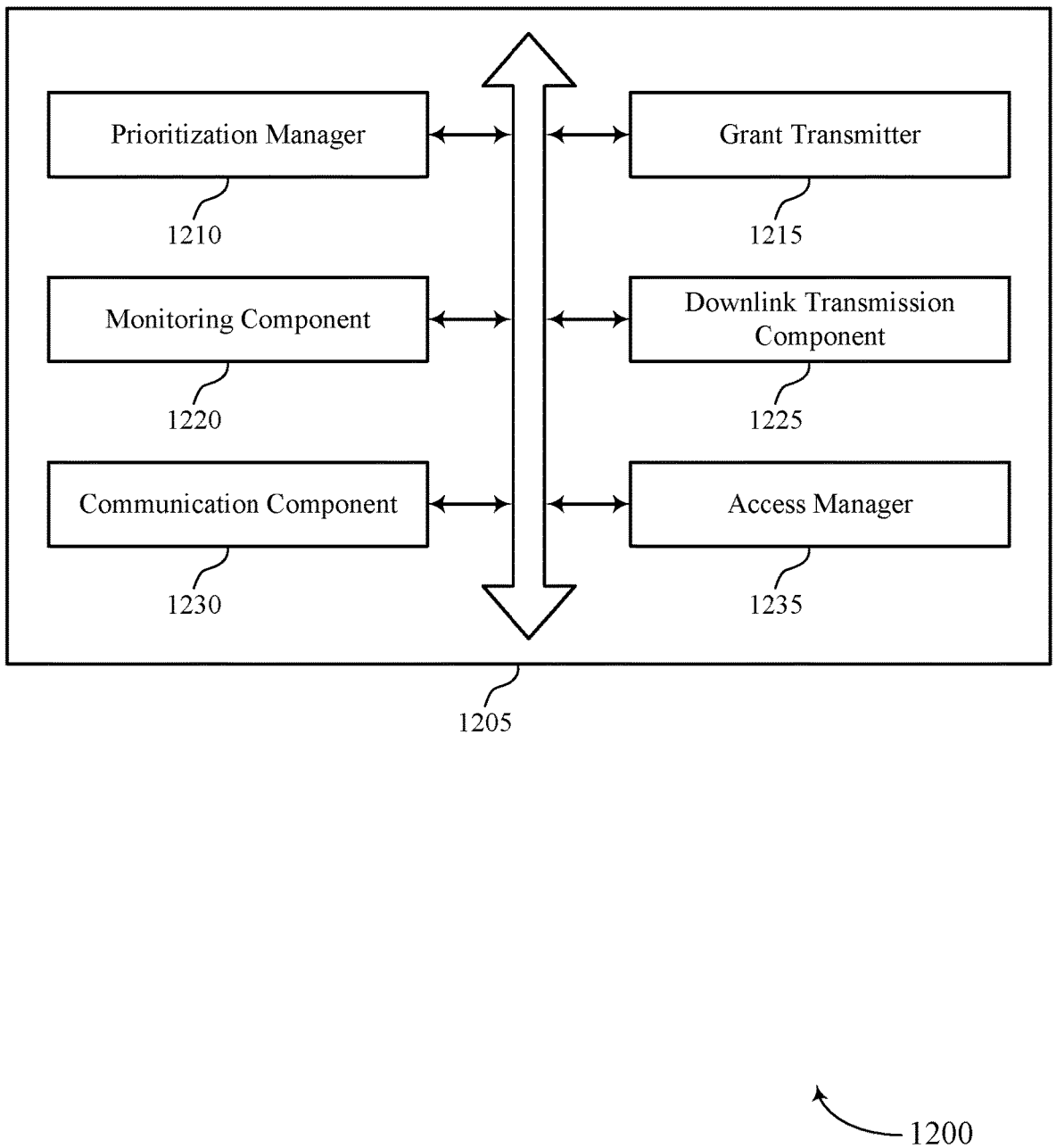
FIG. 12 shows a block diagram of a tentative grant manager that supports synchronous shared spectrum in accordance with aspects of the present disclosure.

FIG. 12 shows a block diagram 1200 of a tentative grant manager 1205 that supports synchronous shared spectrum in accordance with aspects of the present disclosure. The tentative grant manager 1205 may be an example of aspects of a tentative grant manager 1015, a tentative grant manager 1115, or a tentative grant manager 1310 described herein. The tentative grant manager 1205 may include a prioritization manager 1210, a grant transmitter 1215, a monitoring component 1220, a downlink transmission component 1225, a communication component 1230, and an access manager 1235. Each of these modules may communicate, directly or indirectly, with one another (e.g., via one or more buses).

The prioritization manager 1210 may determine a prioritization of the first network OP for a first TxOP and a second TxOP, where the first network OP is higher priority than a second network OP during the first TxOP and the second network OP is higher priority than the first network OP during the second TxOP.

In some examples, the prioritization manager 1210 may determine a priority of the second network OP for the first TxOP and the second TxOP, where transmitting the tentative grant is based on the determined priority of the second network OP.

The grant transmitter 1215 may transmit a tentative grant to a UE over a channel of a shared radio frequency spectrum band using resources within the first TxOP associated with tentative grants based on the determined prioritization, where the tentative grant schedules a downlink data transmission using the channel over a set of resources of the second TxOP subsequent to the first TxOP.

In some examples, the grant transmitter 1215 may transmit a tentative grant to a UE over a channel of a shared radio frequency spectrum band using resources within the first TxOP associated with tentative grants based on the determined prioritization, where the tentative grant schedules an uplink data transmission using the channel over a set of resources of the second TxOP subsequent to the first TxOP. In some cases, the grant transmitter 1215 may transmit the tentative grant to the UE after communicating with the second UE. In some aspects, the grant transmitter 1215 may transmit the tentative grant over a reserved symbol within the first TxOP. In some instances, the grant transmitter 1215 may transmit a one-bit indicator field that conveys an indication of the tentative grant.

The monitoring component 1220 may monitor, during a contention window of the second TxOP, for one or more contention messages from a device associated with the second network OP.

In some examples, the monitoring component 1220 may monitor the set of resources of the second TxOP for the uplink data transmission from the UE. In some cases, the monitoring component 1220 may determine that the second TxOP is available for communication based on the monitoring. In some instances, the monitoring component 1220 may determine that the second TxOP is unavailable for communication based on the monitoring. In some aspects, the monitoring component 1220 may receive the uplink data transmission from the UE via the set of resources of the second TxOP based on an availability of the second TxOP.

The downlink transmission component 1225 may perform the downlink data transmission based on the tentative grant and a result of the monitoring. In some examples, the downlink transmission component 1225 may transmit the downlink data transmission to the UE during the second TxOP based on the determination that the second TxOP is available. In some cases, the downlink transmission component 1225 may withhold the downlink data transmission until a next TxOP.

The communication component 1230 may communicate with a second UE over resources of the first TxOP.

The access manager 1235 may gain access to communicate during the first TxOP based on a contention-based procedure, where the tentative grant is transmitted after gaining access to communicate during the first TxOP. In some examples, the access manager 1235 may participate in a coordinated RC with one or more devices for the first TxOP. In some cases, the coordinated RC is based on a common IMR configuration.

Figure 13:
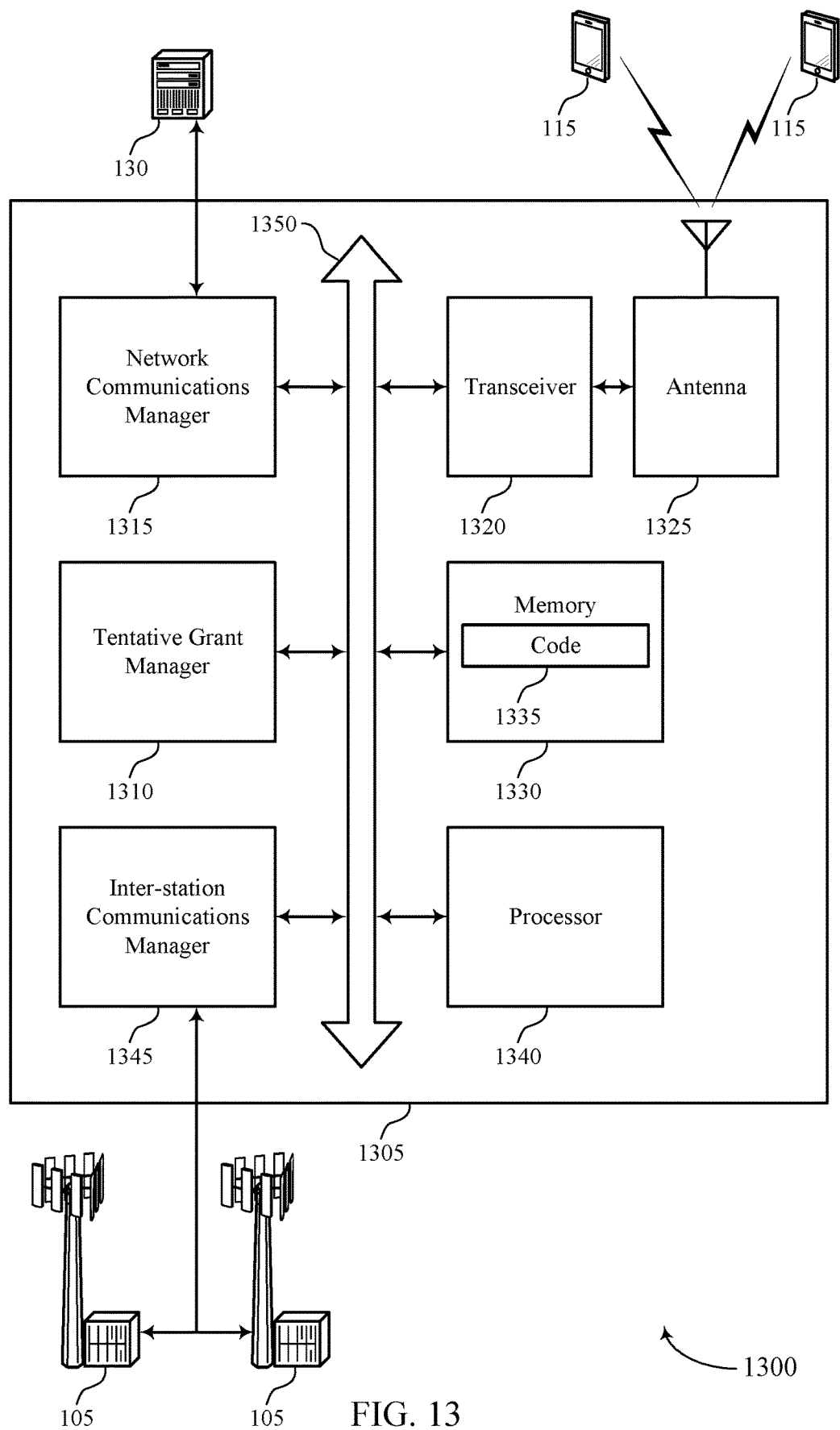
FIG. 13 shows a diagram of a system including a device that supports synchronous shared spectrum in accordance with aspects of the present disclosure.

FIG. 13 shows a diagram of a system 1300 including a device 1305 that supports synchronous shared spectrum in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a tentative grant manager 1310, a network communications manager 1315, a transceiver 1320, an antenna 1325, memory 1330, a processor 1340, and an inter-station communications manager 1345. These components may be in electronic communication via one or more buses (e.g., bus 1350).

The tentative grant manager 1310 may determine a prioritization of the first network OP for a first TxOP and a second TxOP, where the first network OP is higher priority than a second network OP during the first TxOP and the second network OP is higher priority than the first network OP during the second TxOP and transmit a tentative grant to a UE over a channel of a shared radio frequency spectrum band using resources within the first TxOP associated with tentative grants based on the determined prioritization, where the tentative grant schedules a downlink data transmission using the channel over a set of resources of the second TxOP subsequent to the first TxOP. The tentative grant manager 1310 may monitor, during a contention window of the second TxOP, for one or more contention messages from a device associated with the second network OP and perform the downlink data transmission based on the tentative grant and a result of the monitoring.

The tentative grant manager 1310 may also determine a prioritization of the first network OP for a first TxOP and a second TxOP, where the first network OP is higher priority than a second network OP during the first TxOP and the second network OP is higher priority than the first network OP during the second TxOP and transmit a tentative grant to a UE over a channel of a shared radio frequency spectrum band using resources within the first TxOP associated with tentative grants based on the determined prioritization, where the tentative grant schedules an uplink data transmission using the channel over a set of resources of the second TxOP subsequent to the first TxOP. The tentative grant manager 1310 may also monitor the set of resources of the second TxOP for the uplink data transmission from the UE.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting synchronous shared spectrum).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
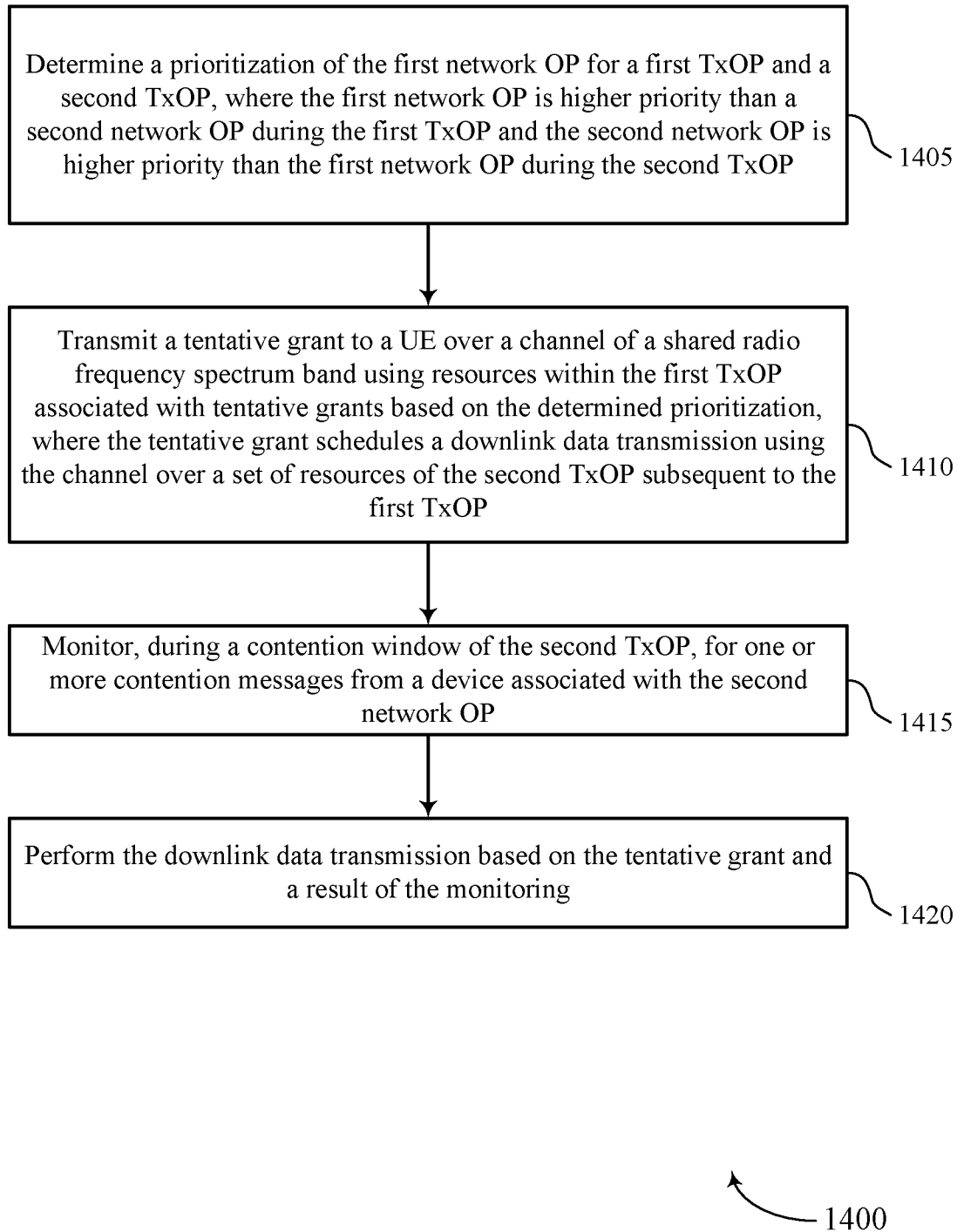
FIGS. 14 through 17 show flowcharts illustrating methods that support synchronous shared spectrum in accordance with aspects of the present disclosure.

FIG. 14 shows a flowchart illustrating a method 1400 that supports synchronous shared spectrum in accordance with aspects of the present disclosure. The operations of method 1400 may be implemented by a base station 105 or its components as described herein. For example, the operations of method 1400 may be performed by a tentative grant manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1405, the base station may determine a prioritization of the first network OP for a first TxOP and a second TxOP, where the first network OP is higher priority than a second network OP during the first TxOP and the second network OP is higher priority than the first network OP during the second TxOP. The operations of 1405 may be performed according to the methods described herein. In some examples, aspects of the operations of 1405 may be performed by a prioritization manager as described with reference to FIGS. 10 through 13.

At 1410, the base station may transmit a tentative grant to a UE over a channel of a shared radio frequency spectrum band using resources within the first TxOP associated with tentative grants based on the determined prioritization, where the tentative grant schedules a downlink data transmission using the channel over a set of resources of the second TxOP subsequent to the first TxOP. The operations of 1410 may be performed according to the methods described herein. In some examples, aspects of the operations of 1410 may be performed by a grant transmitter as described with reference to FIGS. 10 through 13.

At 1415, the base station may monitor, during a contention window of the second TxOP, for one or more contention messages from a device associated with the second network OP. The operations of 1415 may be performed according to the methods described herein. In some examples, aspects of the operations of 1415 may be performed by a monitoring component as described with reference to FIGS. 10 through 13.

At 1420, the base station may perform the downlink data transmission based on the tentative grant and a result of the monitoring. The operations of 1420 may be performed according to the methods described herein. In some examples, aspects of the operations of 1420 may be performed by a downlink transmission component as described with reference to FIGS. 10 through 13.

Figure 15:
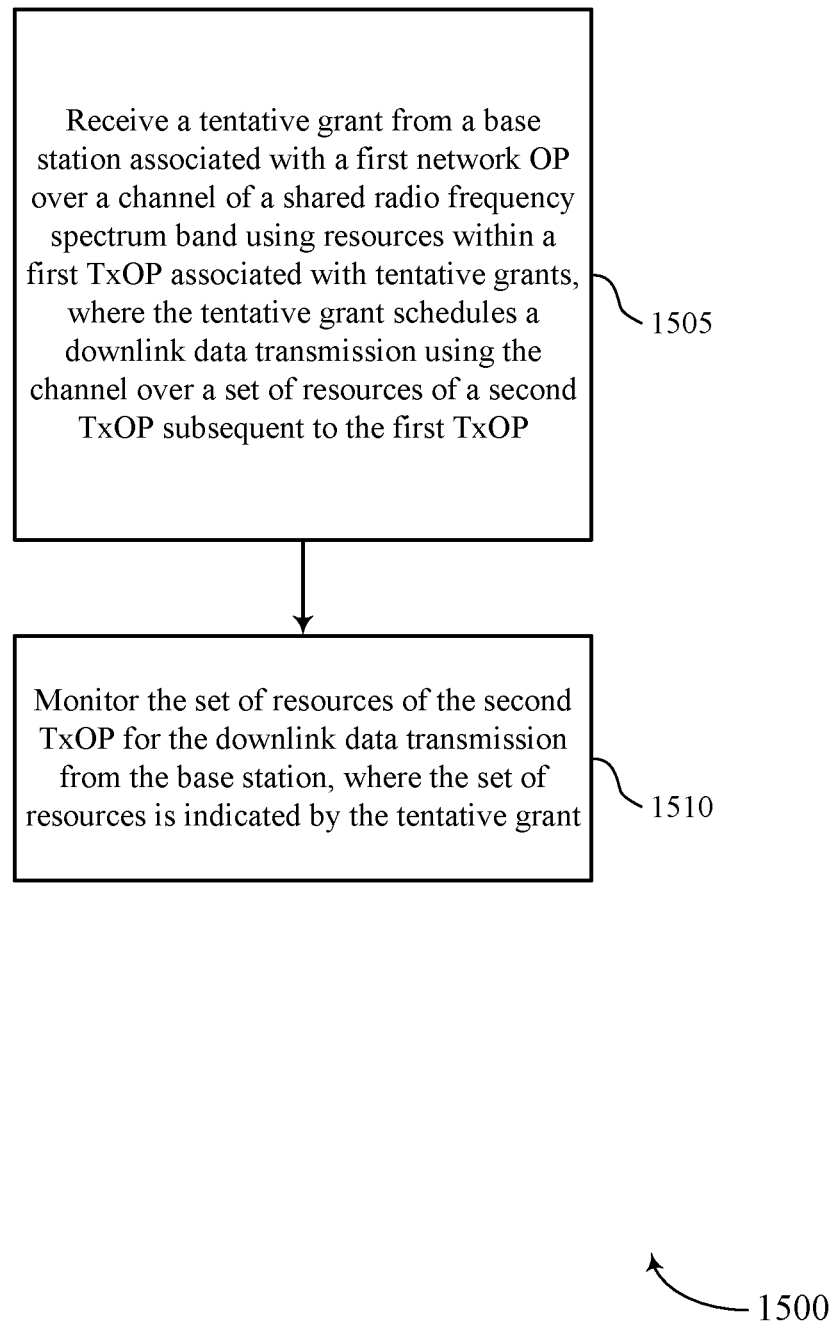

FIG. 15 shows a flowchart illustrating a method 1500 that supports synchronous shared spectrum in accordance with aspects of the present disclosure. The operations of method 1500 may be implemented by a UE 115 or its components as described herein. For example, the operations of method 1500 may be performed by a tentative grant manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may receive a tentative grant from a base station associated with a first network OP over a channel of a shared radio frequency spectrum band using resources within a first TxOP associated with tentative grants, where the tentative grant schedules a downlink data transmission using the channel over a set of resources of a second TxOP subsequent to the first TxOP. The operations of 1505 may be performed according to the methods described herein. In some examples, aspects of the operations of 1505 may be performed by a grant receiver as described with reference to FIGS. 6 through 9.

At 1510, the UE may monitor the set of resources of the second TxOP for the downlink data transmission from the base station, where the set of resources is indicated by the tentative grant. The operations of 1510 may be performed according to the methods described herein. In some examples, aspects of the operations of 1510 may be performed by a monitor as described with reference to FIGS. 6 through 9.

Figure 16:
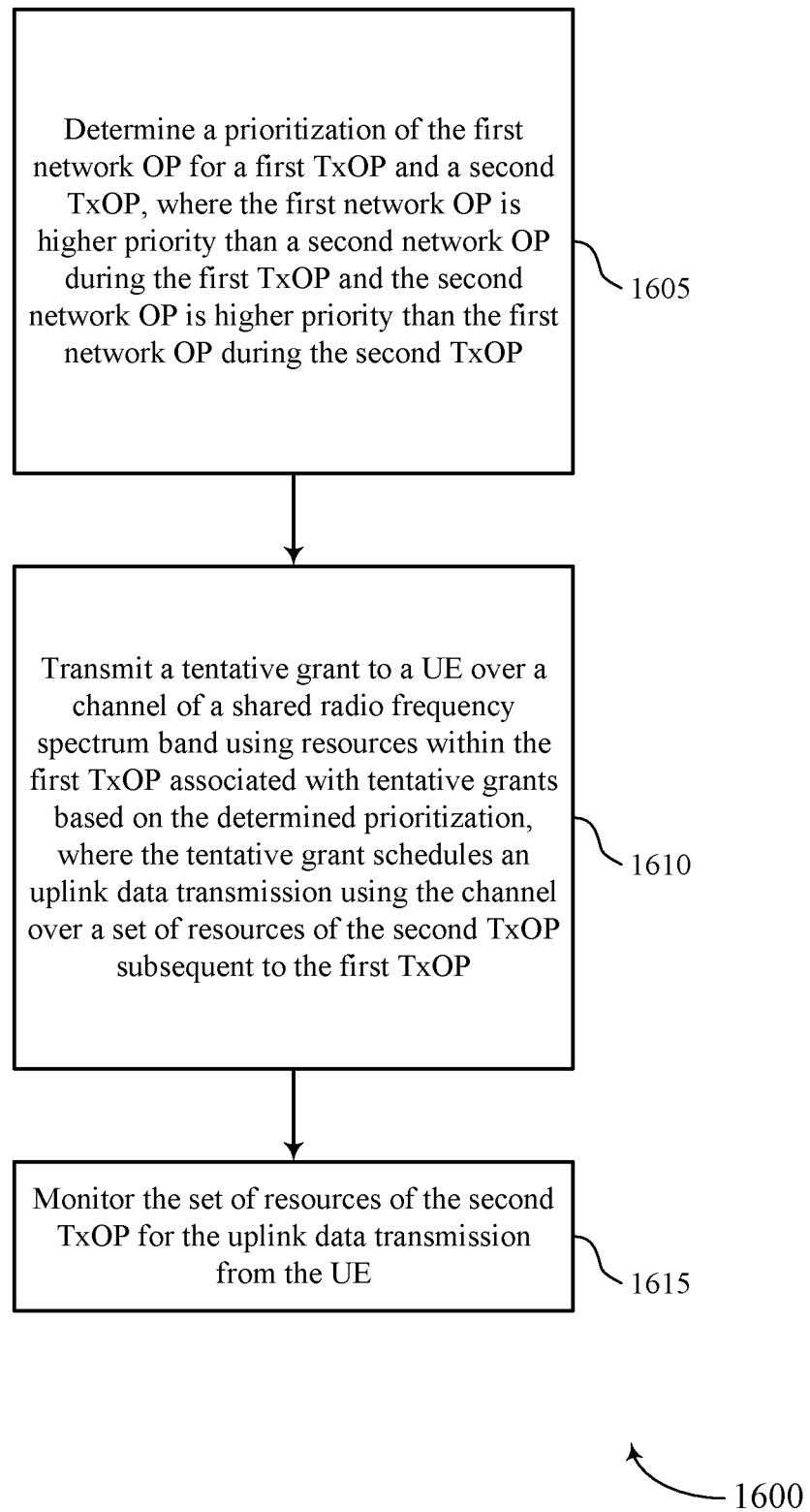

FIG. 16 shows a flowchart illustrating a method 1600 that supports synchronous shared spectrum in accordance with aspects of the present disclosure. The operations of method 1600 may be implemented by a base station 105 or its components as described herein. For example, the operations of method 1600 may be performed by a tentative grant manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1605, the base station may determine a prioritization of the first network OP for a first TxOP and a second TxOP, where the first network OP is higher priority than a second network OP during the first TxOP and the second network OP is higher priority than the first network OP during the second TxOP. The operations of 1605 may be performed according to the methods described herein. In some examples, aspects of the operations of 1605 may be performed by a prioritization manager as described with reference to FIGS. 10 through 13.

At 1610, the base station may transmit a tentative grant to a UE over a channel of a shared radio frequency spectrum band using resources within the first TxOP associated with tentative grants based on the determined prioritization, where the tentative grant schedules an uplink data transmission using the channel over a set of resources of the second TxOP subsequent to the first TxOP. The operations of 1610 may be performed according to the methods described herein. In some examples, aspects of the operations of 1610 may be performed by a grant transmitter as described with reference to FIGS. 10 through 13.

At 1615, the base station may monitor the set of resources of the second TxOP for the uplink data transmission from the UE. The operations of 1615 may be performed according to the methods described herein. In some examples, aspects of the operations of 1615 may be performed by a monitoring component as described with reference to FIGS. 10 through 13.

Figure 17:
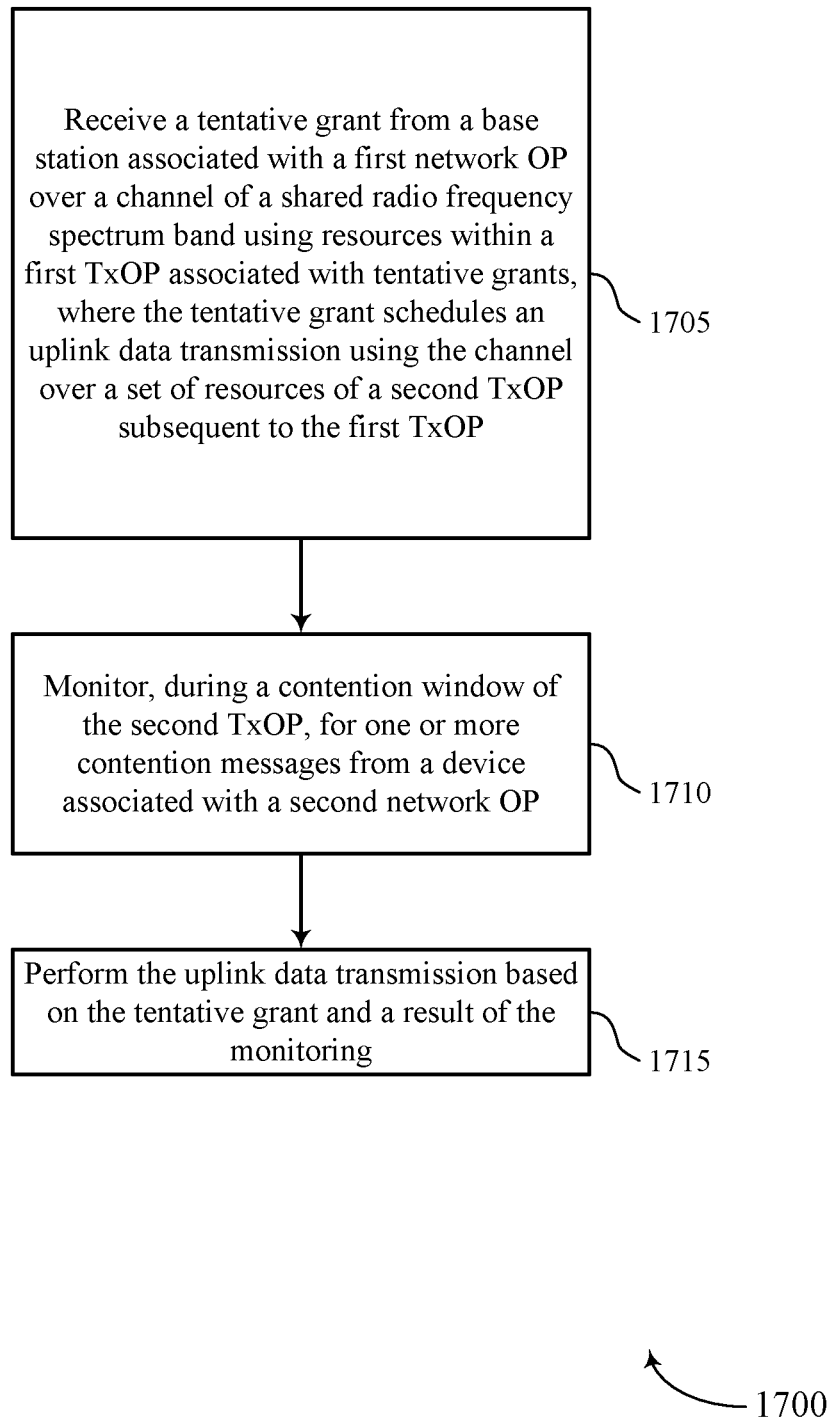

FIG. 17 shows a flowchart illustrating a method 1700 that supports synchronous shared spectrum in accordance with aspects of the present disclosure. The operations of method 1700 may be implemented by a UE 115 or its components as described herein. For example, the operations of method 1700 may be performed by a tentative grant manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1705, the UE may receive a tentative grant from a base station associated with a first network OP over a channel of a shared radio frequency spectrum band using resources within a first TxOP associated with tentative grants, where the tentative grant schedules an uplink data transmission using the channel over a set of resources of a second TxOP subsequent to the first TxOP. The operations of 1705 may be performed according to the methods described herein. In some examples, aspects of the operations of 1705 may be performed by a grant receiver as described with reference to FIGS. 6 through 9.

At 1710, the UE may monitor, during a contention window of the second TxOP, for one or more contention messages from a device associated with a second network OP. The operations of 1710 may be performed according to the methods described herein. In some examples, aspects of the operations of 1710 may be performed by a monitor as described with reference to FIGS. 6 through 9.

At 1715, the UE may perform the uplink data transmission based on the tentative grant and a result of the monitoring. The operations of 1715 may be performed according to the methods described herein. In some examples, aspects of the operations of 1715 may be performed by an uplink transmission component as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications systems 100 or 200 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a base station associated with a first network operator, comprising:
   determining a prioritization of the first network operator for a first transmission opportunity and a second transmission opportunity, wherein the first network operator is higher priority than a second network operator during the first transmission opportunity and the second network operator is higher priority than the first network operator during the second transmission opportunity;
   performing a contention based procedure during a contention window of the first transmission opportunity to gain access to a channel during the first transmission opportunity;
   transmitting, to a user equipment (UE) associated with the first network operator over the channel of a shared radio frequency spectrum band and after gaining access to the channel, a first downlink data transmission using a first set of resources within the first transmission opportunity based at least in part on performing the contention based procedure and a tentative grant using a second set of resources within the first transmission opportunity associated with tentative grants based at least in part on the determined prioritization, wherein the tentative grant schedules a second downlink data transmission using the channel over a third set of resources of the second transmission opportunity subsequent to the first transmission opportunity;
   monitoring, during a contention window of the second transmission opportunity, for one or more contention messages from a device associated with the second network operator; and
   performing the downlink data transmission based at least in part on the tentative grant and a result of the monitoring.

2. The method of claim 1, further comprising:
   determining that the second transmission opportunity is available for communication based at least in part on the monitoring; and
   transmitting the second downlink data transmission to the UE during the second transmission opportunity based at least in part on the determination that the second transmission opportunity is available.

3. The method of claim 1, further comprising:
   determining that the second transmission opportunity is unavailable for communication based at least in part on the monitoring; and
   withholding the second downlink data transmission until a next transmission opportunity.

4. The method of claim 1, further comprising:
   communicating with a second UE over the first set of resources of the first transmission opportunity; and
   transmitting the tentative grant to the UE after communicating with the second UE.

5. The method of claim 1, further comprising:
   participating in a coordinated rate control with one or more devices for the first transmission opportunity.

6. The method of claim 5, wherein the coordinated rate control is based at least in part on a common interference management resource (IMR) configuration.

7. The method of claim 5, wherein the coordinated rate control is indicated by a plurality of coordinated rate control signals.

8. The method of claim 1, further comprising:
   transmitting the tentative grant over a reserved symbol within the first transmission opportunity.

9. The method of claim 1, wherein transmitting the tentative grant comprises:
   transmitting a one-bit indicator field that conveys an indication of the tentative grant.

10. The method of claim 1, wherein the tentative grant comprises a tentative transmitter identifier (ID), a tentative receiver ID, a tentative set of radio resources, a clear channel assessment (CCA) threshold, a plurality of coordinated rate control signals, a rank threshold, a channel quality indication (CQI) threshold, or hybrid-automatic repeat request (HARQ) feedback information, or any combination thereof.

11. The method of claim 1, further comprising:
   determining a priority of the second network operator for the first transmission opportunity and the second transmission opportunity, wherein transmitting the tentative grant is based at least in part on the determined priority of the second network operator.

12. A method for wireless communications at a user equipment (UE), comprising:
   receiving, from a base station associated with a first network operator over a channel of a shared radio frequency spectrum band, a first downlink data transmission using a first set of resources within a first transmission opportunity and a tentative grant using a second set of resources within the first transmission opportunity associated with tentative grants, wherein the tentative grant schedules a second downlink data transmission using the channel over a third set of resources of a second transmission opportunity subsequent to the first transmission opportunity, wherein the UE is associated with the first network operator; and
   monitoring the third set of resources of the second transmission opportunity for the second downlink data transmission from the base station, wherein the third set of resources is indicated by the tentative grant.

13. The method of claim 12, wherein monitoring the set of resources comprises:
   receiving the second downlink data transmission from the base station during the second transmission opportunity based at least in part on an availability of the second transmission opportunity.

14. The method of claim 12, further comprising:
   determining a prioritization of the first network operator for the first transmission opportunity and the second transmission opportunity, wherein the first network operator is higher priority than a second network operator during the first transmission opportunity and the second network operator is higher priority than the first network operator during the second transmission opportunity.

15. The method of claim 12, wherein receiving the tentative grant comprises:

receiving a one-bit indicator field that conveys an indication of the tentative grant.

16. The method of claim 12, wherein the tentative grant comprises a tentative transmitter identifier (ID), a tentative receiver ID, a tentative set of radio resources, a clear channel assessment (CCA) threshold, a plurality of coordinated rate control signals, a rank threshold, a channel quality indication (CQI) threshold, or hybrid-automatic repeat request (HARQ) feedback information, or any combination thereof.

17. An apparatus for wireless communications at a base station associated with a first network operator, comprising:
a processor;
memory coupled with the processor; and
instructions stored in the memory and executable by the processor to cause the apparatus to:
determine a prioritization of the first network operator for a first transmission opportunity and a second transmission opportunity, wherein the first network operator is higher priority than a second network operator during the first transmission opportunity and the second network operator is higher priority than the first network operator during the second transmission opportunity;
perform a contention based procedure during a contention window of the first transmission opportunity to gain access to a channel during the first transmission opportunity;
transmit, to a user equipment (UE) associated with the first network operator over the channel of a shared radio frequency spectrum band and after gaining access to the channel, a first downlink data transmission using a first set of resources within the first transmission opportunity based at least in part on performing the contention based procedure and a tentative grant using a second set resources within the first transmission opportunity associated with tentative grants based at least in part on the determined prioritization, wherein the tentative grant schedules a second downlink data transmission using the channel over a third set of resources of the second transmission opportunity subsequent to the first transmission opportunity;
monitor, during a contention window of the second transmission opportunity, for one or more contention messages from a device associated with the second network operator; and
perform the downlink data transmission based at least in part on the tentative grant and a result of the monitoring.

18. The apparatus of claim 17, wherein the instructions are further executable by the processor to cause the apparatus to:
determine that the second transmission opportunity is available for communication based at least in part on the monitoring; and
transmit the second downlink data transmission to the UE during the second transmission opportunity based at least in part on the determination that the second transmission opportunity is available.

19. The apparatus of claim 17, wherein the instructions are further executable by the processor to cause the apparatus to:
determine that the second transmission opportunity is unavailable for communication based at least in part on the monitoring; and
withhold the second downlink data transmission until a next transmission opportunity.

20. The apparatus of claim 17, wherein the instructions are further executable by the processor to cause the apparatus to:
communicate with a second UE over the first set of resources of the first transmission opportunity; and
transmit the tentative grant to the UE after communicating with the second UE.

21. The apparatus of claim 17, wherein the instructions are further executable by the processor to cause the apparatus to:
transmit the tentative grant over a reserved symbol within the first transmission opportunity.

22. The apparatus of claim 17, wherein the instructions to transmit the tentative grant are executable by the processor to cause the apparatus to:
transmit a one-bit indicator field that conveys an indication of the tentative grant.

23. The apparatus of claim 17, wherein the tentative grant comprises a tentative transmitter identifier (ID), a tentative receiver ID, a tentative set of radio resources, a clear channel assessment (CCA) threshold, a plurality of coordinated rate control signals, a rank threshold, a channel quality indication (CQI) threshold, or hybrid-automatic repeat request (HARQ) feedback information, or any combination thereof.

24. An apparatus for wireless communications at a user equipment (UE), comprising:
a processor;
memory coupled with the processor; and
instructions stored in the memory and executable by the processor to cause the apparatus to:
receive, from a base station associated with a first network operator over a channel of a shared radio frequency spectrum band, a first downlink data transmission using a first set of resources within a first transmission opportunity and a tentative grant using a second set resources within the first transmission opportunity associated with tentative grants, wherein the tentative grant schedules a second downlink data transmission using the channel over a third set of resources of a second transmission opportunity subsequent to the first transmission opportunity, wherein the UE is associated with the first network operator; and
monitor the third set of resources of the second transmission opportunity for the second downlink data transmission from the base station, wherein the third set of resources is indicated by the tentative grant.

25. The apparatus of claim 24, wherein the instructions to monitor the set of resources are executable by the processor to cause the apparatus to:
receive the second downlink data transmission from the base station during the second transmission opportunity based at least in part on an availability of the second transmission opportunity.

26. The apparatus of claim 24, wherein the instructions are further executable by the processor to cause the apparatus to:
determine a prioritization of the first network operator for the first transmission opportunity and the second transmission opportunity, wherein the first network operator is higher priority than a second network operator during the first transmission opportunity and the second network operator is higher priority than the first network operator during the second transmission opportunity.

27. The apparatus of claim 24, wherein the instructions to receive the tentative grant are executable by the processor to cause the apparatus to:

receive a one-bit indicator field that conveys an indication of the tentative grant.

28. The apparatus of claim 24, wherein the tentative grant comprises a tentative transmitter identifier (ID), a tentative receiver ID, a tentative set of radio resources, a clear channel assessment (CCA) threshold, a plurality of coordinated rate control signals, a rank threshold, a channel quality indication (CQI) threshold, or hybrid-automatic repeat request (HARQ) feedback information, or any combination thereof.

* * * * *